Sept. 2, 1958   J. T. McNANEY   2,850,723
TRANSLATION AND DISPLAY APPARATUS
Filed March 4, 1953   7 Sheets-Sheet 1

INVENTOR:
Joseph T. McNaney
BY
ATTORNEY

Sept. 2, 1958 J. T. McNANEY 2,850,723
TRANSLATION AND DISPLAY APPARATUS
Filed March 4, 1953 7 Sheets-Sheet 2
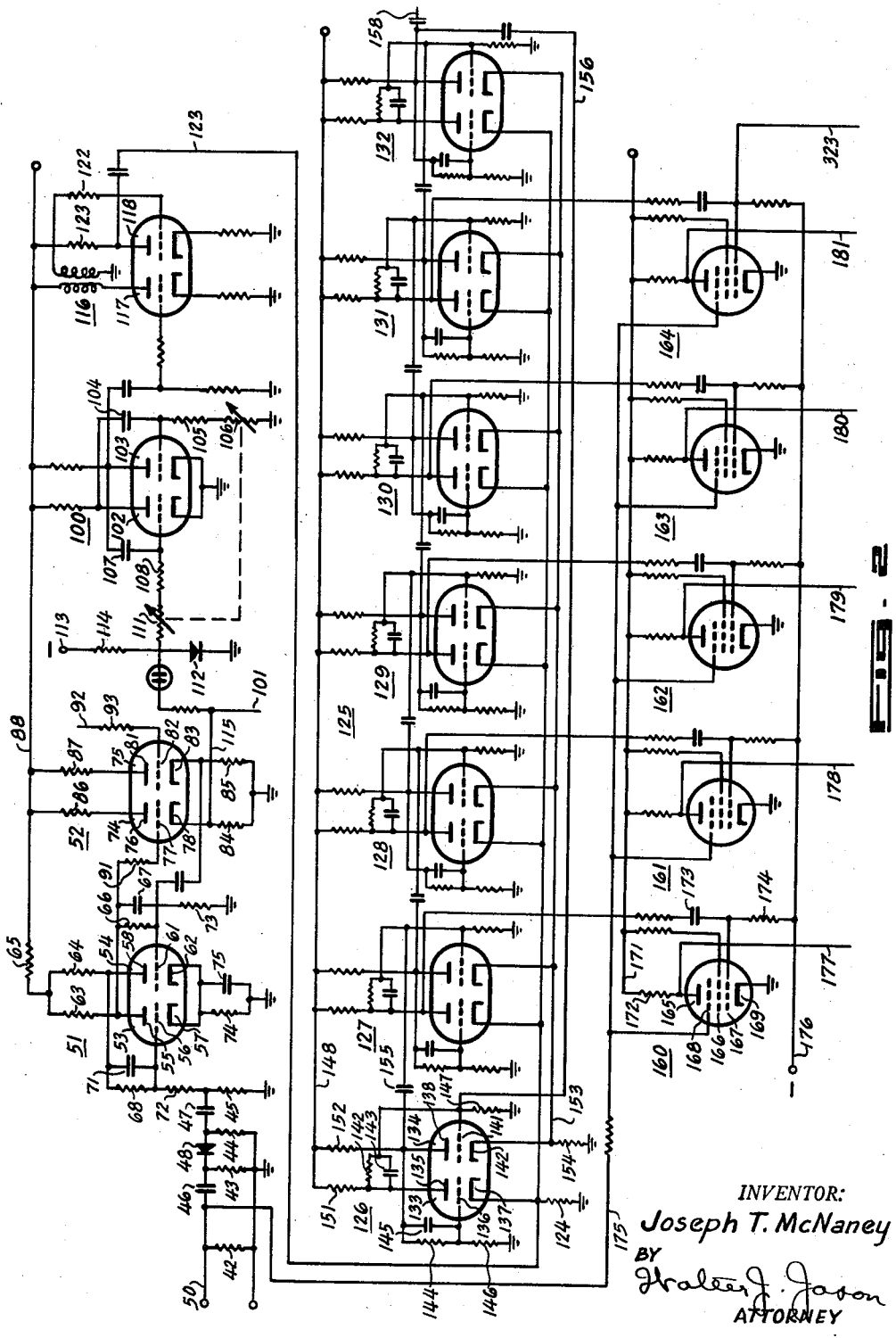

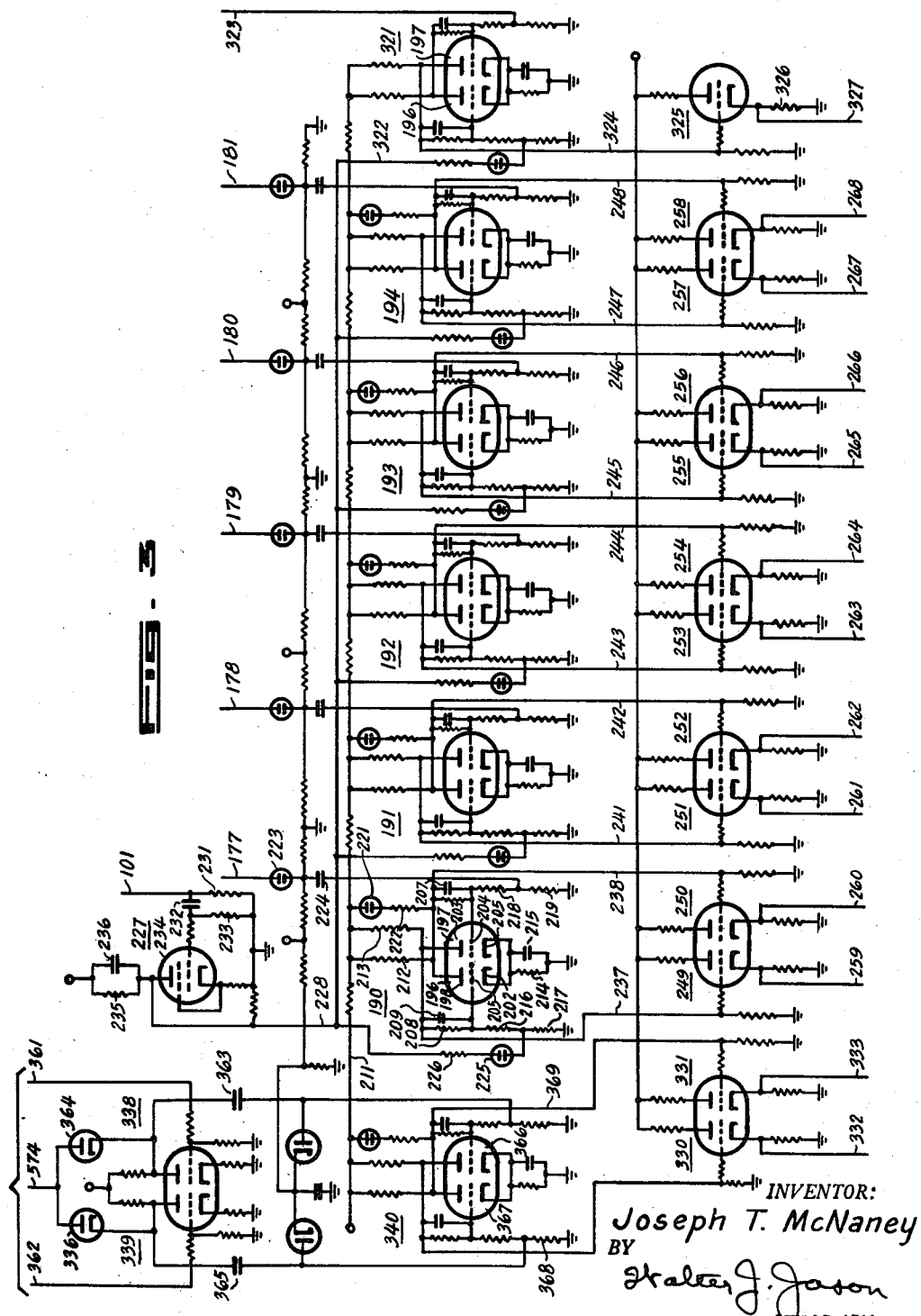

Sept. 2, 1958    J. T. McNANEY    2,850,723
TRANSLATION AND DISPLAY APPARATUS
Filed March 4, 1953    7 Sheets-Sheet 4
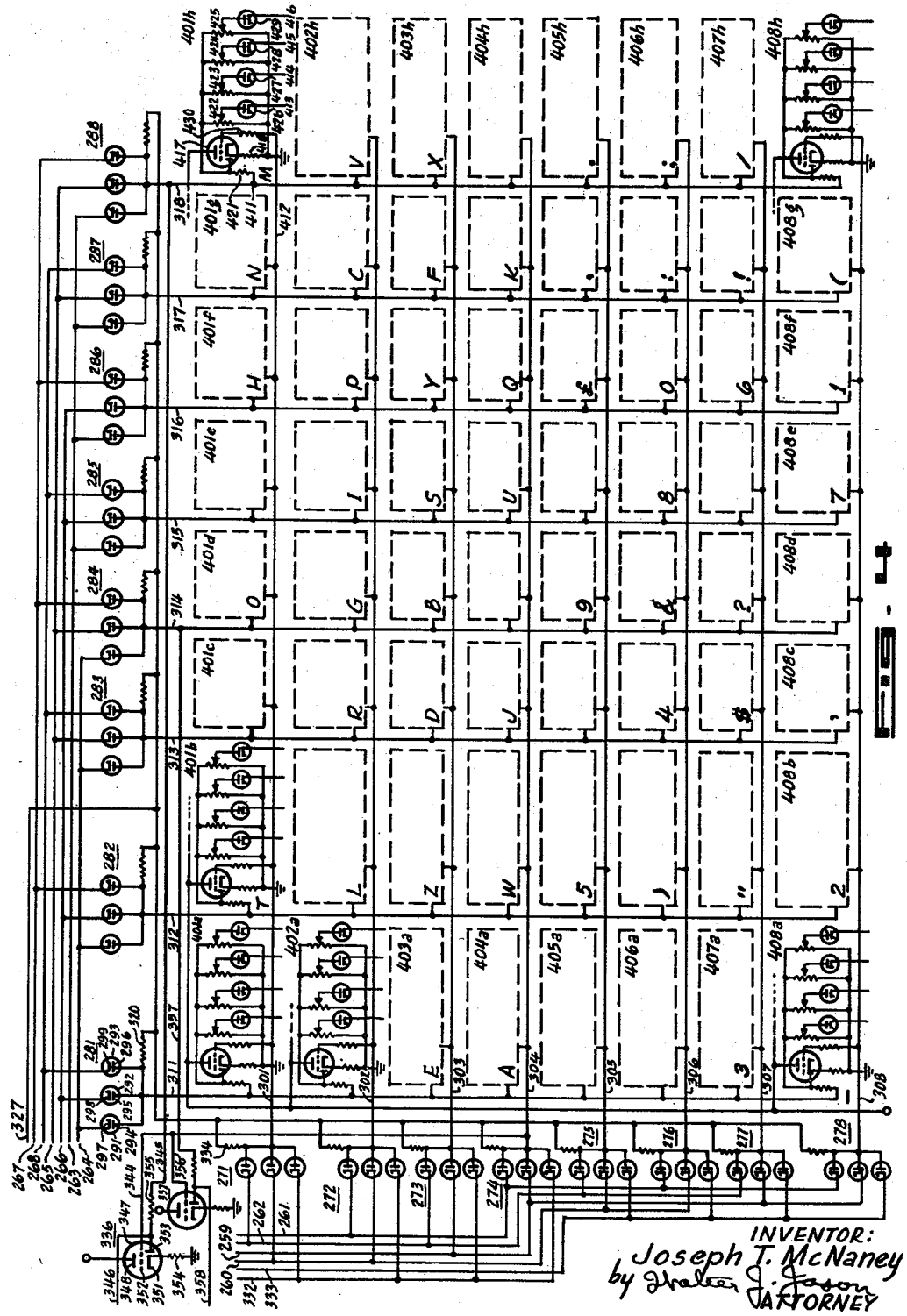
INVENTOR:
Joseph T. McNaney
by [signature]
ATTORNEY Sept. 2, 1958  J. T. McNANEY  2,850,723
TRANSLATION AND DISPLAY APPARATUS
Filed March 4, 1953  7 Sheets-Sheet 5
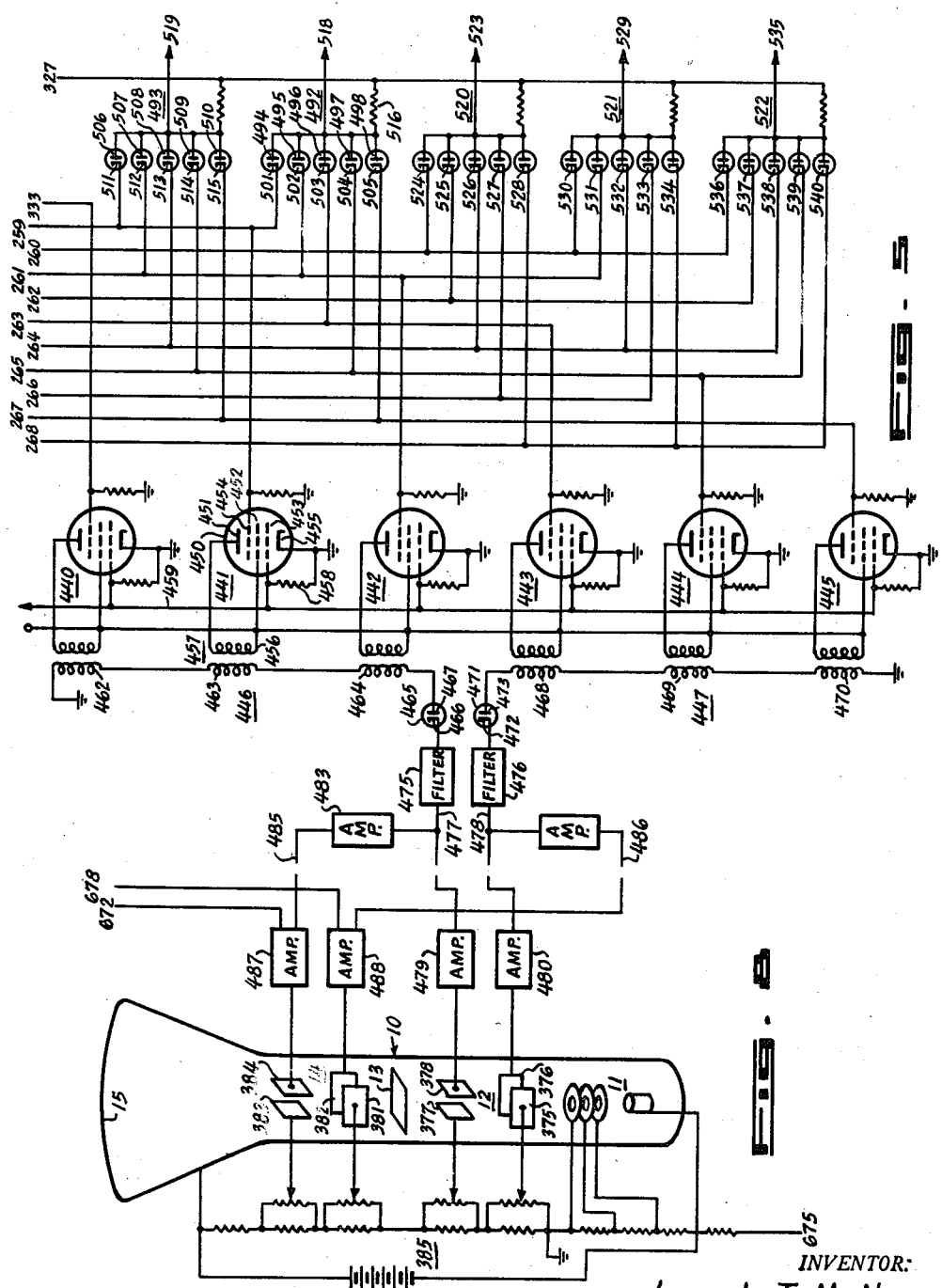
INVENTOR:
Joseph T. McNaney
BY
ATTORNEY Sept. 2, 1958  J. T. McNANEY  2,850,723
TRANSLATION AND DISPLAY APPARATUS
Filed March 4, 1953  7 Sheets-Sheet 6
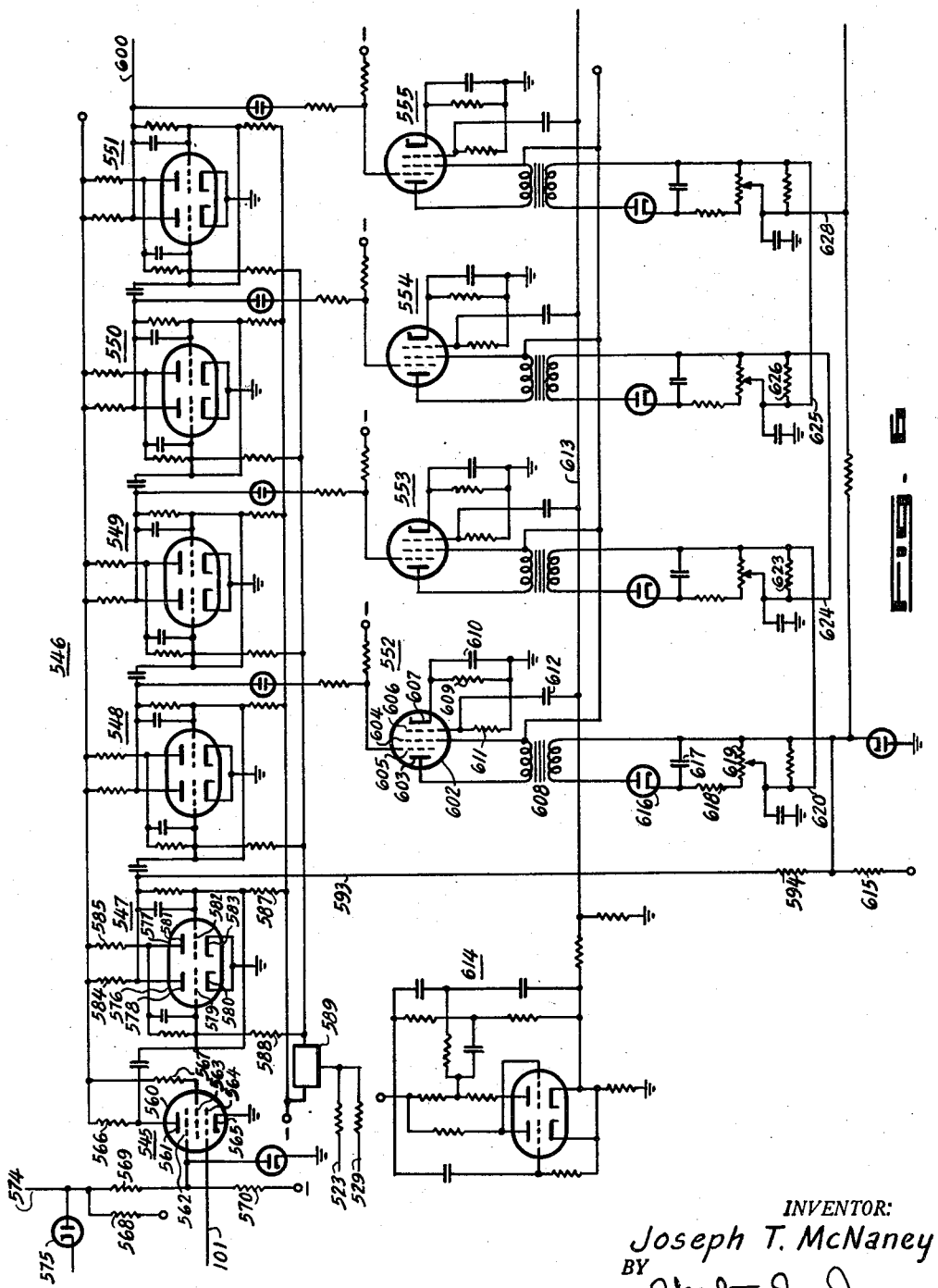
INVENTOR:
Joseph T. McNaney
BY
ATTORNEY

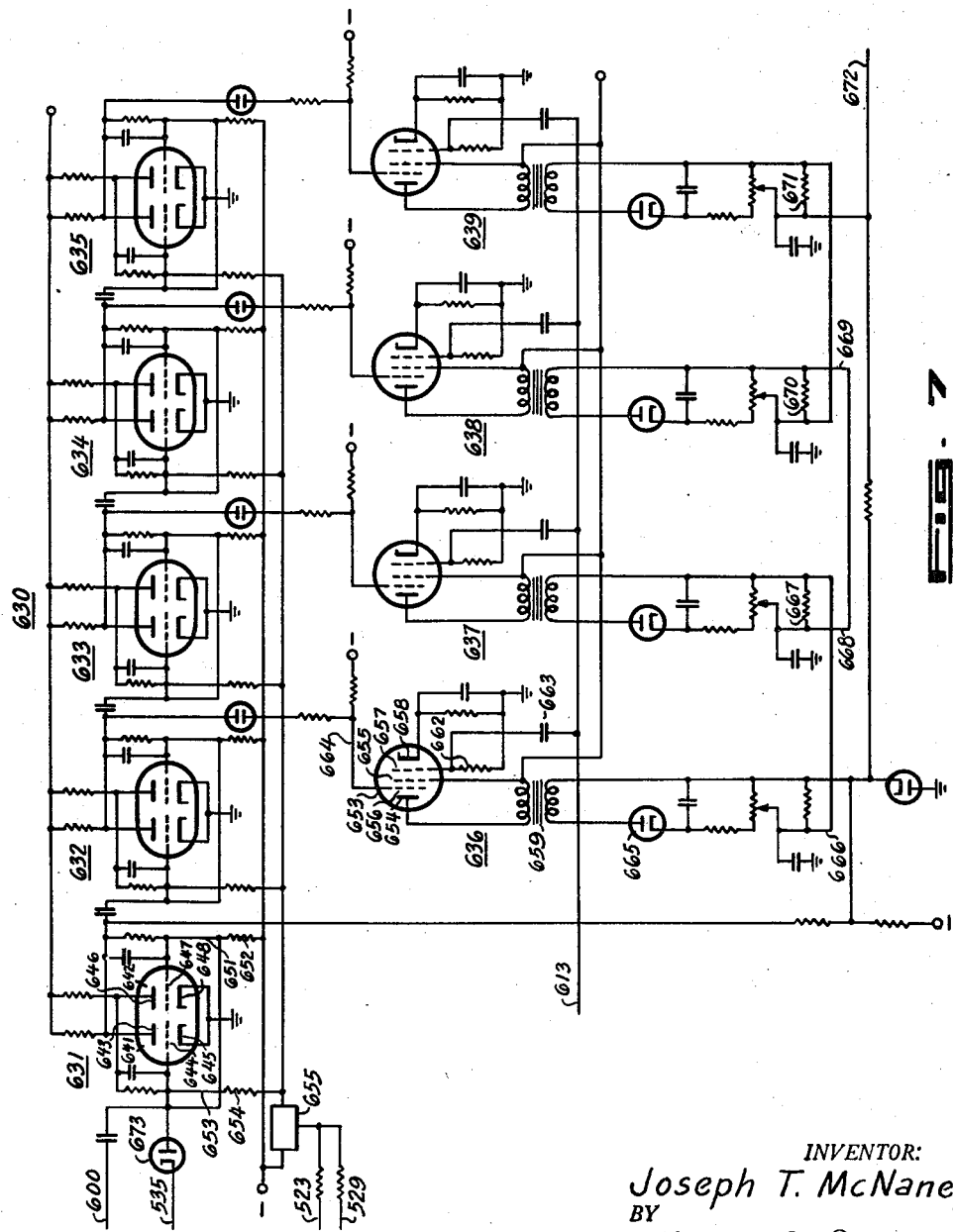

United States Patent Office 2,850,723
Patented Sept. 2, 1958

2,850,723
TRANSLATION AND DISPLAY APPARATUS

Joseph T. McNaney, San Diego, Calif., assignor, by mesne assignments, to General Dynamics Corporation, a corporation of Delaware Application March 4, 1953, Serial No. 340,245

4 Claims. (Cl. 340—324)

This invention relates to new and novel means for interpreting pulse coded data and visually displaying the message in intelligible form upon the fluorescent screen of an electron tube.

An object of this invention is to provide a method of and means for rapidly and accurately decoding pulse coded information and displaying the intelligence in the form of numbers, letters, or related characters.

Another object of this invention is to provide an electronic method of translating pulse coded signals and displaying the message in the desired form, wherein all mechanical movement is eliminated.

Another object of this invention is to provide simplified and accurate means for transforming coded time sequential data into time coincident data.

A further object of this invention is to provide means for rapidly and automatically positioning and spacing successive numbers, letters, and/or related characters upon the fluorescent screen of an electron tube.

Other objects and features of this invention will be readily apparent to those skilled in the art from the following specification and appended drawings illustrating certain preferred embodiments of this invention in which:

Fig. 3 is a schematic circuit diagram showing the memory circuits and letter-figure circuits of the distributor unit.

Fig. 4 is a circuit diagram illustrating one embodiment of the selector control unit of the present invention.

Fig. 5 is a circuit diagram showing a second embodiment of the selector control unit of the present invention.

Fig. 6 is a schematic circuit diagram of the space deflection unit.

Fig. 7 is a schematic circuit diagram of the line deflection unit.

Fig. 8 is a diagrammatic representation of a charactron type cathode ray tube, and Fig. 9 is a timing diagram showing an exemplified incoming pulse coded signal and the time sequence of circuits of the distributor unit.

For many types of transmission, experience has proven that for simplicity of operation, reliability, and efficiency, signals representing the different characters should be of uniform length, that is, each character should contain the same number of time units. The principle of this invention is exemplified in conjunction with a five unit code group where each character is identified by impulses in five units of time, but the principle upon which this invention is based is not so limited. The system is expansible to accommodate other code groups as will be readily apparent to those skilled in the art.

Within an individual time unit of each code group, two and only two conditions may exist, i. e., an "on" or an "off" current condition. This binary representation thus yields $2^5$, or 32 permutations. In addition to the five character impulses, a starting impulse of unit time duration may be used and with a pause interval at the end of each five unit code group, the total period for each character will be equal to 7.42 time units.

Figure 1:
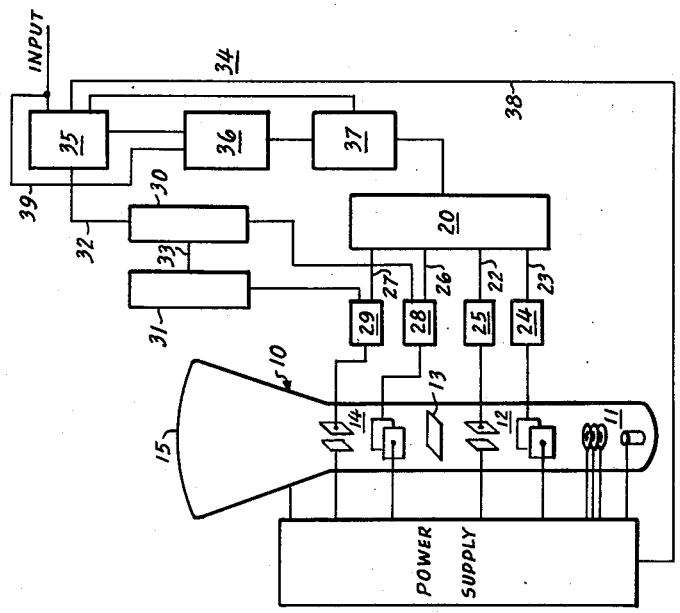
Fig. 1 is a generalized block diagram of the device.

The generalized block diagram of Fig. 1 includes a cathode ray device 10, hereinafter denoted as a charactron tube, which is disclosed in my co-pending application No. 297,480, filed July 7, 1952, now Patent No. 2,803,769. The charactron tube 10 described therein comprises generally an electron gun 11, selection means 12, character shaping means 13, deflection means 14, and a fluorescent screen 15, all of which are enclosed in an evacuated envelope. The circularly cross-sectioned electron beam, which is generated by the electron gun 11, travels from the electron gun 11 to the fluorescent screen 15, passes through the selection means 12, which are employed to direct the beam to a predetermined position on the character shaping means 13. Transverse movement of the beam, may be effected by an electrostatic field established by the application of potentials impressed upon the selection means 12 which comprise a pair of horizontal conducting plates and a pair of vertical conducting plates positioned on each side of the beam. Electrostatic fields between the horizontal plates provide movement of the beam in the left-right plane, whereas the field within the vertical plates provides movement in the up-down plane. Since the angle at which the beam emerges from the selection system is proportional to the potential difference existing between each pair of conducting plates, the electron beam may be directed to any position upon the transversely positioned character shaping means 13 by the application of predetermined potentials upon the selection plates. The aforementioned character shaping means 13 may include a matrix with individually shaped openings therein in the form of letters, numerals, and related symbols. The electron beam upon passing through any given opening in the matrix will assume the characteristic shape of that opening. These character shaped openings may be arranged within the matrix in lineal columns and rows, and for purposes of illustration the configuration herein selected comprises eight columns and eight rows, thus providing a possible 64 different and distinct characters in a row-column coordinate system with the letters located in the upper one-half of the matrix whereas the numerals and related characters are arranged in the lower one-half of the matrix.

After the shaping operation of the electron beam by the matrix 13, the beam passes through the deflection system 14 and is projected upon the fluorescent viewing screen 15, which gives off light where bombarded by the shaped electron beam. The deflection system 14 comprises a pair of horizontal and vertical conducting plates which are operationally similar to those of the selection system and serve to properly space and position the shaped electron beam upon the fluorescent screen 15.

Unidirectional selection potentials, developed by a selector control unit 20 to be described in detail hereinafter, are utilized in association with the selection means 12 to establish the required electrostatic fields for positioning the electron beam upon the character shaping matrix 13. Serially pulse coded data, utilizing the aforementioned five unit code group to represent the desired character wherein each code element is in time sequence, is presented to the selector control unit 20 in time coincidence by the action of a distributor unit 21, also to be described in detail hereinafter. The selector control unit 20 transforms this time coincident pulse coded information into two independent unidirectional potentials 22 and 23, one of which is applied after amplification by an amplifier 24 to a horizontal selection plate with the other being applied after amplification by an amplifier 25 to a vertical selection plate. The potential applied to the vertical selection plate is controlled by the conditions of the first and second code elements, hereinafter denoted as code elements A and B, whereas the horizontal selection plate voltage is governed by the conditions of the third, fourth, and fifth code elements, hereinafter denoted as code elements C, D, and E, respectively. Means are provided for developing, in the presence of "on" conditions for the aforementioned code elements A, B, C, D and E, predetermined, relative potential magnitudes of 2, 1, 4, 2, 1, respectively. With "off" conditions for the code elements being registered as zero potentials, then considering the "on" or "off" conditions in which each code element may exist, four additive potential combinations, zero through three, are provided by combining the relative potential magnitudes of code elements A and B, which as hereinbefore stated, control the voltages applied to the vertical selection plate. Similarly, considering the "on" or "off" conditions in which each of the code elements C, D, and E may assume and the predetermined, relative potentials associated therewith, eight additive potential combinations, zero through seven, may be provided to the horizontal selection plate. Means associated with the aforementioned circuits for developing the predetermined potentials which serve to properly combine said potentials and transmit the additive potential to the selection plates will be readily understood from the detailed description thereof. Now, assuming that code elements A and B remain constant, by applying to the horizontal selection plate the eight additive potential combinations in the sequence zero through seven obtainable from code elements C, D and E and by providing an appropriate voltage multiplication factor dependent upon the deflection sensitivity of the electron beam and supplied by the amplifier 24, these additive potential combinations will sequentially align the electron beam with the eight columnar disposed openings within the character shaping matrix 13. It then becomes apparent that selection of any particular column may be made by the proper summation voltage when applied to the horizontal selection plate. Although only four potential combinations resulting from code elements A and B are available to the vertical selection plate, orientation of the electron beam for proper row selection of the characters is based upon the same principle and is accomplished in a manner similar to that of column selection. However, in order to provide selection of any one of eight rows, means are employed in the form of a letter-figure circuit (described in detail in conjunction with the selector control unit 20) which responds to a particular code group and develops a relative predetermined potential of four. When combined with the voltage multiplying factor supplied by amplifier 25 mentioned hereinbefore and applied to the vertical selection plate this normalized voltage magnitude of four causes the electron beam to shift down four rows, or to the lower half of the matrix. Thus, the function of the letter-figure circuit is somewhat analogous to the shift key of the well-known typewriter.

Two unidirectional potentials, 26 and 27, developed by the selector control unit 20 are also applied, respectively, after modification by amplifiers 28 and 29, to a horizontal and vertical conducting plate of the deflection system 14. This provides a means for compensating for the difference in the position of different characters in the matrix 13. The electrostatic fields produced by these potentials direct the shaped electron beam at all times to a position at the upper left corner of the fluorescent screen 15. This position, upon the viewing screen, is the initial or starting position for all information or characters which are displayed. In the absence of other potentials being applied to the horizontal or vertical deflection plates each successive character would appear at this same position upon the screen and superimposed upon the preceding one. However, space and line deflection units, 30 and 31, are provided which comprise means whereby the individual characters to be displayed are progressively spaced and linearly positioned upon the viewing screen by applying predetermined potentials to the horizontal and vertical deflection plates. The general aspects of the deflection units, 30 and 31, are more readily understood by assuming that both the space and line positioning units, 30 and 31, have been cleared prior to reception of the starting impulse of a new code cycle. Under this condition, all circuits associated with the deflection units remain set at zero and responsive during the six time units allotted the starting impulse and the five element code group, hereinafter denoted the selection cycle, and the initially selected character, as stated above, will be positioned in the upper-left corner of the screen as viewed from the front of the tube. Upon completion of the selection cycle, a timing pulse generated by the distributor unit and supplied to a line 32 is applied to a gating circuit which is incorporated in the space deflection unit 30 which controls the passage of impulses to the remaining circuits of the deflection units. Where the selection cycle is one representative of a letter, numeral, or related symbol as distinguished from a functional operation, such as line reset, line feed, screen reset, or letter-numeral identification, a pulse is generated by the counter gate wherein a count of one is registered in the space deflection unit 30. In the embodiment exemplifying the principle of the present invention, the space deflection counter comprises trigger circuits which yield $2^5$ or 32 stable states and thereby provides for spacing and positioning 32 characters per line in response to successive pulses applied to the gating circuit; but it is understood that the principle is not so limited. By adding additional counter circuits the capacity of the deflection unit 30 may be increased. The space deflection and the line deflection units, 30 and 31, are coupled such that upon the application of the 32nd pulse from the gating circuit, the space deflection counter is returned to zero and a count is registered over a lead 33 in the line deflection unit 31. Successive pulses are applied to the line counter by the spacing counter upon the reception of each 32 code cycles, that is, after a complete line of characters has been lineally spaced and positioned upon the fluorescent viewing screen 15. The voltages developed by the space deflection unit 30 and applied to the horizontal deflection plate of the charactron tube are stepping voltages which increase progressively in magnitude by predetermined potential increments as each successive code group is counted and thereby causes the shaped electron beam to be progressively stepped in position on the screen. The voltages developed by the line deflection unit 31 and applied to the vertical deflection plate of the charactron tube are similarly stepping voltages which increase progressively in magnitude by predetermined potential increments as each group of 32 successive code groups are counted.

The present invention also includes a distributor unit 34 which comprises a timing unit 35, pulse channelling circuits 36, and memory circuits 37 which are effective to transform pulse coded time sequential data into correlative time coincident data as well as providing necessary timing operations for all units. The timing source frequency is preferably chosen so that the period of one cycle of the timing source is made substantially equal to the period of each code element of the code selection cycle. Thus, five cycles of the timing source output are substantially equal in time to the five element code group representatives of each character. However, where it becomes advantageous, the frequency of the timing source may be automatically controlled by the rate of the incoming code elements or from an external source having some relation to the frequency of the applied code elements. As hereinbefore stated, the five element code group is preceded by a starting impulse of unit time duration, which is applied to the timing unit 35, the leading edge of which may be utilized to actuate circuit means employed to control the actuation of the free running timing source. Upon actuation of the timer, a chain of pulses is applied to a linear counter of the pulse channelling circuits 36, said counter being employed to furnish progressively a single timed pulse to each of five channels associated with the five element code group representative of the character. In the present invention, when utilized with a five element code group, after five and one-half cycles of the timing circuit each of the five channels will have received one time sequenced actuating pulse and upon generation of the next succeeding timing cycle, a signal is developed whereby the linear counter is reset to its original status, the timing source actuating circuit is reset thereby rendering it again receptive to an incoming signal, the timing unit 35 is rendered inactive and a gating pulse is applied both to the charactron tube over a lead 38 and to the space deflection unit over the lead 32.

In addition to the timed pulse applied progressively to the five channels of the distributor unit, and preferably positioned in time at the center of each code element, each individual code element of the five unit code group is applied simultaneously to all the five channels of the pulse channelling circuits 36 by an input conductor 39. A signal pulse is produced in the appropriate channel when, and only when, time coincidence is established between the timed pulse and an individual code element. A signal pulse produced thereby is applied to the associated memory circuit 37 which provides retention and storage of the developed information relating to the existence or nonexistence of the particular code element. This time coincident data appearing in the output of the memory circuits is applied to the aforementioned selection control unit 20, wherein the two unidirectional selection voltages, 22 and 23, are developed and ultimately applied to the selection plates of the charactron tube 10.

In addition, the present invention incorporates means for automatically performing in response to identifiable code groups the desired line and screen reset functional operations and the line feed functional operation. By the term "line reset" is meant the operation of repeating a particular line of information by clearing but a single line of characters. By the term "screen reset" is meant the operation of clearing the entire viewing screen of information and thereby initiating a complete new presentation of displayed characters. By the term "line feed" is meant the operation of stopping the line of displayed characters and positioning the following character on the next line. Reception and registration of a line reset code group produces an impulse to all counter circuits of the space deflection counter which clears and resets the circuits to zero. A screen reset code group, when received and translated by the circuitry of the present invention, provides a clear and reset impulse to both the line and the space deflection units thereby positioning the subsequent character at the initial position at the upper left corner of the viewing screen. In response to a line feed code group a count is applied to the line deflection counter thereby positioning the next character displayed upon the screen on the next line with succeeding characters spaced and lineally positioned relative thereto.

Figure 2:
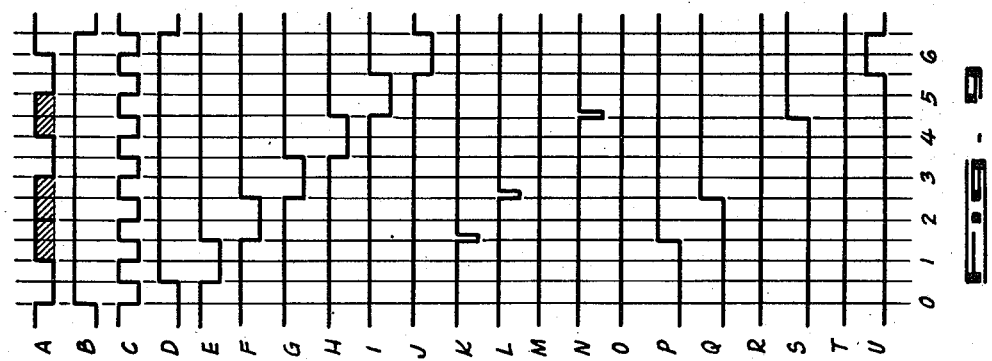
Fig. 2 is a schematic circuit diagram illustrating the timing system and channelling circuits associated with the distributor unit.

Figure 2 illustrates in detail the timing system 35 and the channelling circuits 36 which serve to transform the serial code elements into time coincident information in five separate channels assigned to the code elements A, B, C, D and E. The timing system 35 includes an actuator 40 and a timing source 41 with the actuator 41 providing means for controlling the commencement of the timing cycle in addition to providing means, which upon completion of the timing cycle, serves to inactive the timing source 41. Further, the actuator 40 affords an identification timing signal to other units of the present invention thereby signifying completion of the selection cycle. Means associated with the actuator 40 which serve to block out reception of unwanted signals and also serve to produce narrow time duration impulses from the received waveforms include resistors 42, 43, 44 and 45 and capacitors 46 and 47. A rectifying element 48 is included within the network and when properly connected prevents positive impulses from reaching the actuator 41. As shown in Figure 9, line A, the aforementioned starting impulse which precedes the five element character code group is a negative rectangular wave and is introduced to input terminal 50. The input terminal 50 is connected to ground through the resistor 42, and is also connected to ground through three cascaded parallel paths afforded by the blocking condenser 46 and resistor 43, the diode 48 and load resistor 44, and condenser 47 and grid return resistor 45. Since the time constant of the blocking condenser 46 and the resistor 43 is long compared to the period of the starting impulse, the potential appearing across resistor 42 is essentially reproduced across resistor 43. With the rectifying element 48 connected in the manner indicated, the negative potential impressed across resistor 43 causes the diode 48 to become conductive, which allows current to flow through the load resistor 44, whereas, a positive potential appearing across resistor 43 prevents conduction of the rectifying element and, therefore, limits a positive potential to this point in the circuit. The negative voltage appearing across the load resistor 44 is applied to the differentiating network comprising condenser 47 and grid return resistor 45 which develops the desired trigger pulse from the rectangular starting impulse. Since the potential across the condenser 47 cannot change instantaneously, the leading edge of the negative potential appearing across resistor 44 appears entirely across resistor 45, but as the condenser 47 charges with time, the voltage appearing at the common terminal of the condenser and resistor correspondingly decreases and rapidly approaches zero. The negative triggering signal thereby developed is a short time duration pulse whose leading edge is coincident in time with the leading edge of the rectangularly shaped starting impulse preceding the five element code group. This triggering pulse is introduced in the grid circuit of the timing source actuator 41, which comprises a triggering circuit 51 and an actuator 52. The triggering circuit 51 comprises two triodes 53 and 54 with triode 53 including an anode 55, a control grid 56, and a cathode 57 with triode 54 similarly having an anode, 58, a control grid 61 and a cathode 62. The triggering circuit 51, consisting of the two triodes 53 and 54 and associated circuitry, is conductively arranged to provide a symmetrical circuit having two distinct stable conditions. The anodes 55 and 58 are connected to a source of unidirectional potential (not shown) through load resistors 63 and 64, respectively, and a common resistor 65. Anode 55 is coupled to the control grid 61 of triode 54 through a parallel connected coupling resistor 66 and condenser 67, while anode 58 is interconnected to the control grid 56 of triode 53 through a like coupling arrangement consisting of a resistor 68 and a condenser 71. The control grid 56 is returned to ground through a grid limiting resistor 72 and the grid return resistor 45 and control grid is returned to ground through grid resistor 73. A common biasing arrangement is provided between the two triodes by connecting the interconnected cathodes to ground through a parallel connected cathode resistor 74 and bypass condenser 75.

The symmetrical circuit arrangement of the triggering circuit 51 provides two conditions of stable equilibrium, therefore, in operation, if it is assumed that triode 53 is conductive, then triode 54 will be non-conductive. The negative triggering pulse which is applied to the control grid of triode 53 decreases the anode current flow from the potential source through the resistors 63 and 65, the triode 53, and the common cathode resistor 74 and causes the potential appearing at the anode 55 to rise abruptly. This rise in potential is coupled to the control grid 61 of triode 54 and initiates anode current flow through triode 54 and with the anode 58 connected to the control grid 56 of triode 53 the decreased potential existing at the anode 58 causes a further decrease in the potential at the control grid 56 of triode 53. This condition of instability prevails and continues to drive the operation of triodes 53 and 54 until triode 54 is conducting at saturation and triode 53 is cut-off. With the triggering circuit 51 in this status, wherein triode 53 is cut-off, the application of additional negative impulses is ineffectual to reverse the established condition. Since positive impulses are at all times prevented from reaching the triggering circuit 51 by the action of the rectifying element 48, it therefore becomes apparent that after the triggering circuit 51 has been actuated, additional pulses, either positive or negative, will have no effect until the circuit is reset to its original condition.

The potentials developed by the triggering circuit 51 and appearing at the anode of triode 53 are applied to the grid circuit of the circuit 52, which includes a vacuum tube comprising, within a single envelope, two triodes 74 and 75, with triode 74 having an anode 76, a control grid 77, and a cathode 78, and with triode 75 having an anode 81, a control grid 82, and a cathode 83. Cathodes 78 and 83 are connected to ground through load resistors 84 and 85, respectively, and anodes 76 and 81 are connected through resistors 86 and 87 to a lead 88 which affords anode voltage for both triodes. Circuit 52, as indicated by the drawings, is a dual cathode follower circuit with triode 74 being associated with the initiation of the timing cycle, whereas, triode 75 is operative solely in conjunction with the termination of the timing cycle. An input terminal to triode 74 is provided which serves to couple the potentials developed by the trigger circuit 51 to the actuator 52 by interconnecting the anode of the triode 53 and the control grid of triode 74 through a resistor 91. An input terminal 92 is provided to triode 75 which transfers the output of the linear counter, to be hereinafter described, to the circuit 52 by interconnecting the output of the counter to the control grid 82 of the triode 75 through a resistor 93.

The positive impulse, as shown by the timing sequence graph of Fig. 9B, appears at the anode of triode 53 and is coincident with the leading edge of the starting impulse. Under steady state or quiescent conditions, triode 74 is conductive, and upon the application of the positive impulse to the control grid 77 of triode 74, an increase in anode current thereby results with a corresponding rise in potential appearing across the cathode load resistor 84. The positive potential impulse appearing at the cathode 84 of triode 74, the leading edge of which is coincident in time with the leading edge of the triggering impulse, is transmitted both as the actuating potential to a timing source 100 and by a lead 101 as a priming pulse to the memory circuits of the distributor unit to be hereinafter described. In the exemplified embodiment of the invention, a multivibrator circuit is utilized as the timing source 100 and provides the desired timing signals. The timing source 100, consisting of two triode electron tubes 102 and 103 and the associated circuitry, is arranged to provide, after actuation, a free running source of pulses. Coupling between the two triodes 102 and 103 is provided by connecting the anode of each tube to the control grid of the other tube. Anode of triode 102 is connected to the control grid of triode 103 through a coupling condenser 104 and to ground through a grid return resistor 105 and a grid return potentiometer 106. Anode of triode 103 is coupled to the control grid of triode 102 by a coupling condenser 107 and to ground through grid return resistor 108, a grid return potentiometer 111, and a rectifier 112. A source of negative bias potential 113 (not shown) the positive terminal of which is grounded, is connected through a dropping resistor 114 to the control grid of triode 102 through the resistor 108 and the potentiometer 111. The application of this negative bias potential to triode 102 assures that in the absence of outside potentials being applied to the control grid, triode 102 will be non-conductive, thereby rendering the timing source 100 inactive.

In operation, the aforementioned positive impulse appearing at the cathode 78 of circuit 52 is coupled by a lead 115 to the control grid of triode 102. The magnitude of this positive actuating impulse is sufficient to override the negative bias voltage appearing at the control grid and also at the anode of the rectifier 112. The rectifier 112 thereupon becomes conductive and, in effect, connects the common terminal point of the potentiometer 111 and resistor 114 to ground, whereupon the triode 102 and its associated circuitry becomes essentially balanced with triode 103 and its corresponding components. The positive actuating impulse initiates a current flow from the supply source through the lead 88, the load resistor, and triode 102 to ground which causes a switching action in circuit 100 and results in triode 102 being driven into conduction with triode 103 being driven to cut-off. The plate voltage appearing at the anode of triode 103, which was low before actuation, now is near the magnitude of the potential source. The control grid of triode 103, which was driven negative and below cut-off, does not remain in this condition indefinitely but rises exponentially toward zero as the coupling condenser 104 discharges through the grid return resistor 105 and potentiometer 106. As the cut-off voltage of triode 103 is reached, anode current flow commences in triode 103 and a second switching action, similar to the first, takes place except that anode current through triode 103 is now increasing, whereas, the current flow through triode 102 is decreasing. This second switching action results in triode 103 conducting at saturation while triode 102 becomes cut-off and the voltage appearing at the anode of triode 103 again becomes low. This flip-flop action of the triodes 102 and 103 continues uninterrupted and since the two halves of the timing source are balanced, the voltages appearing at the anodes thereof are similar with the period of the negative half cycles being equal to the positive half cycles.

The equal periods during which the triodes 102 and 103 are cut-off are determined by the discharge time constants of the coupling condensers 104 and 107 and the grid return potentiometers 111 and 106. It, therefore, becomes apparent that the frequency at which the free running timing source operates may be controlled by adjustment of the potentiometers 106 and 111. In order to maintain the balanced condition of the two halves of the circuit and thereby assure equal cut-off periods for the triodes 102 and 103, the grid return potentiometers 106 and 111 may be mechanically linked together, as shown by the drawings, and varied simultaneously. As hereinbefore stated, the timing source frequency is selected in accordance with the frequency of the individual elements comprising the five unit code group which represents the characters to be displayed. In the disclosed embodiment of the invention, a timing source frequency of 44.5 cycles per second is utilized, but it is understood that the principle of this invention is not limited thereto.

The chain of timing pulses generated by the timing source and which appear at the anode of triode 103 is initiated coincidently with the leading edge of the starting impulse, and the period of one timing cycle is equal to one time unit of the selection cycle code group. The timing pulses are capacitively coupled to a driver circuit 116 which provides means for amplifying the timing pulses, and comprises triodes 117 and 118. The operation of the two stage driver circuit is conventional and well-known to those skilled in the art; the amplified timing pulses which appear in the plate circuit of triode 117 and across the primary winding of a transformer 121 are inverted in polarity from the timing pulses applied to the control grid. The stepped-up voltage supplied by the transformer 121 is delivered from its secondary winding to the control grid of triode 118 through a limiting resistor 122. The inverted timing pulses applied to the control grid of triode 118 are amplified and appear across a load resistor 123 of triode 118. The amplified timing pulses which appear across the load resistor 123 of triode 118 are coupled by a lead 123 to a common cathode resistor 124 of a linear counter denoted generally by numeral 125. The counter 125, which produces successive pulses at the timing source frequency, as indicated by the timing of diagram of Figs. 9E to 9J, comprises seven identical stages, 126 to 132, each including a counter circuit which provides a single pulse, time positioned in accordance with the timing cycle. Since the counter circuits 126 to 132, as hereinbefore indicated, are identical units, only one counter circuit will be described in detail and corresponding elements of each circuit will be assigned the same reference numeral. Counter stage 126 comprises two electron tubes 133 and 134 with tube 133 including an anode 135, a control grid 136, and a cathode 137, and tube 134 also having an anode 138, a control grid 141, and a cathode 142. Tubes 133 and 134 with their associated components provide a balanced or symmetrical counter circuit having two conditions of stable equilibrium. Anode 135 of tube 133 is coupled to the control grid 141 of tube 134 by a parallel connected coupling network, comprising a resistor 142 and a coupling condenser 143. A similar connection is provided by coupling anode 138 of tube 134 to the control grid 136 of tube 133 through a parallel connected network comprising a resistor 144 and a coupling condenser 145. Control grids 136 and 141 are individually returned to ground through grid return resistors 146 and 147, respectively. Anode voltage is afforded tubes 133 and 134 by suitable connections to a potential source (not shown) through a common lead 148 and load resistors 151 and 152, respectively. The cathode 137 of tube 133 is connected to the common signal input lead 123, which interconnects the corresponding cathodes of each counter circuit and which is connected to the common terminal of the coupling condenser and the common cathode resistor. The cathode 142 of tube 134 is connected directly to a common cathode lead 153 which interconnects the corresponding cathodes of each of the counter circuits 126 to 132, and which lead is connected to ground through a resistor 154. With each of the counter circuits connected and arranged in the above described manner, one of said tubes 133 or 134 will be conductive and the other will be non-conductive at any instant. The condition in which tube 133 is conductive and tube 134 is non-conductive will be hereinafter denoted the "primed" or "set" condition, whereas, when tube 133 is non-conductive with tube 134 by necessity then being conductive, this condition will be denoted the "normal" or "reset" condition of the counter circuit. Coupling between successive counter circuits is afforded by interposing a coupling condenser 155 between the anode of tube 134 and the control grid of tube 134 of the succeeding stage, thus providing means for transferring a pulse for priming or setting the next higher counter circuit each time the lower counter circuit changes its status from the primed condition back to the normal condition. The output of counter circuit 132 is carried back to the input of counter 126 by interconnecting the anode 138 of tube 134 of counter circuit 132 by a lead 156 to the control grid 141 of tube 134 of counter circuit 126 through a coupling condenser 157. Therefore, the condition of the linear counter 125, as a whole, assures that there is one counter circuit in the primed condition while the other counter circuits are in the normal condition.

The operation of the linear counter 125 is more readily understood if it is assumed that the counter circuit 126 is in its primed or set condition and counter circuits 127, 128, 129, 130, 131 and 132 are in their normal or reset status prior to actuation of the timing source multivibrator 100. This is the condition established after reception, translation, and display of a preceding signal and the system is awaiting reception of the next signal code group. Referring to Fig. 2 and the timing diagram of Fig. 9, it will be noted that during the quiescent period and prior to actuation of the timing system by the leading edge of the starting impulse, the potential developed by the timing source 100 and amplified by the driver circuit 116 is low, or negative, with respect to its zero reference. At the instant the starting impulse is applied to the timing system the potential appearing at the anode of triode 103 of the timing source 100 goes positive and as a result of the inversion characteristic in the driver circuit, an amplified potential with inverted polarity appears at the anode of triode 118. The potentials illustrated in Fig. 9C and appearing at the output of triode 118 of the driver circuit 116 are applied across the common cathode resistor 124 and through the common signal input lead 123 to the cathodes 137 of triodes 133 of each counter circuit. This negative pulse when applied to the cathodes 137, is ineffectual to alter the status of the counter circuits. As indicated by the timing diagram of Fig. 9C, one-half cycle later, however, the timing source potential goes positive with respect to its zero reference and is applied to the common signal input lead 123 and simultaneously to the cathodes 137 of each counter circuit. This positive pulse is of sufficient magnitude to trigger triode 133 into its non-conductive state and to restore circuit 126 to its normal or reset condition. Upon this reversal from its primed to normal condition, a pulse is transferred to counter circuit 127 which provides the necessary signal to reverse its status from a normal to a primed condition. The net effect of the first positive input pulse coupled to the linear counter 125 is to restore the set counter circuit 126 to its reset condition while setting the next higher counter circuit 127. Successive timing input signals cause the counter circuit previously in the primed condition to resume its normal condition while simultaneously driving the next succeeding counter circuit into its primed condition. Thus, it may be seen that the primed condition advances sequentially along the counter chain, moving one stage each instant the timing pulse goes positive and referring to the timing diagram of Fig. 9 the time sequential pulse appearing at the anode of tubes 133 of each counter circuit is exhibited. Upon registering 6½ timing input cycles, whereupon the status of counter 132 is reversed from its primed to its normal status, a pulse is carried back to the input of counter circuit 126 which restores it to the original set condition which prevailed prior to the first timing pulse. Simultaneously therewith, a pulse is applied from the counter circuit 132 over a lead 158 to the control grid 82 of triode 75 of the actuator circuit 52 and through the lead 92 and the limiting resistor 93. This negative pulse appears without inversion at the cathode 83 of the cathode follower actuator 52, which is connected to the control grid 61 of triode 54 of the triggering circuit 51. This terminating impulse, when applied to the control grid 61, reverses the condition of the triggering circuit 51, thereby rendering it once again responsive to the incoming pulse. Upon reversal of the triggering circuit 51, a negative impulse is applied to the control grid 77 of triode 74 which essentially removes the positive potential from the grid circuit of the timing source 100, thus stopping the generation of timing pulses by the multivibrator. Upon completion of the described timing cycle it becomes apparent that all units of the timing system are automatically returned to the original conditions which prevailed prior to the reception of the starting impulse. The terminating impulse, which is applied from the actuator 52 to the timing source 100 and effectively terminates the oscillations of the timing circuit, is also simultaneously applied over the lead 101 to a pulse to memory reset circuit 157 (shown in Fig. 3) thus signifying the completion of the timing cycle and also to a space deflection unit (shown in Fig. 6).

The schematic diagram shown in Fig. 2 also illustrates in detail the nature of the circuitry comprising the five coincident gates, 160 to 164 which, in association with the counter 125, provide means for distributing the five code elements into their assigned channels. As indicated by the drawings, the five coincident gates are identical and therefore, only gate 160 will be described in detail. Each circuit, such as gate 160, includes an anode 165, a screen grid 166, a first control grid 167, a second control grid 168, and a cathode 169, with plate voltage being furnished from a potential source by a common anode lead 171 and through a plate load resistor 172 to the anode 165. Output leads 177, 178, 179, 180, and 181 are connected to the anodes 165 associated with the circuits 160 to 164, respectively, and serve to transmit the signals developed thereby to the memory circuits to be described hereinafter. The first control grid 167 is connected to the anode 135 of tube 133 of its associated counter circuit 127 by a condenser 173 which, in combination with a grid return resistor 174, forms a differentiating network which develops a short duration triggering pulse from the fixed time sequential pulse generated by the counter circuit. The first control grids 167 of each of the coincident gates 161 to 164 are coupled in an identical manner to the counter circuits 128 to 131, respectively, and as the primed conduction condition advances sequentially along the counter stages moving one stage each instant the timing source generates a negative pulse and each stage is returned to its normal or reset condition, a positive triggering pulse is applied to the control grid 167 of the associated coincident gate. The first control grid 167 of each circuit is connected through the grid return resistor 174 to a negative bias line 176 which is connected to a negative source of potential (not shown) which serves to bias the gating circuits 160 to 164 to cut-off under quiescent conditions. Each individual time sequential pulse coded element which comprises the five element code group is applied simultaneously to the second control grids 168 of each of the coincident gates 160 to 164 by a common lead 175. As hereinbefore mentioned, within an individual time unit of each code group, two, and only two, conditions may exist, i.e., an "on" or an "off" condition, and when "on" a positive potential appears during the particular time interval and is applied to the second control grid 168 of gating circuits 160 to 164 by the lead 175 and each of the circuits is allowed to become conductive. When, however, an "off" condition, or negative potential, appears during a particular time interval, all gating circuits are, by virtue of the negative voltage applied to the second control grids 168, driven to cut-off irrespective of the voltage applied to the first control grid 167 of a particular circuit. Under quiescent conditions wherein no signals are applied to the coincident gates 160 to 164 from either the counter 125 or the incoming pulse coded characters, the gates are non-conductive and the potential at the anode 165 is high. The gates 160 to 164 are similarly non-conductive and no potential drop appears across the load resistor 172 when but one of the two positive input signals is present at the control grid 167 or the grid 168. However, in the event of a timing pulse and an "on" code pulse appearing simultaneously at the two input grids, the tube becomes conductive and a pulse appears in the output of the coincident gate. Assuming that code element A is in its "on" condition and since a pulse is developed in the output of counter circuit 127 of linear counter 125 during the first code element period, it then becomes apparent that the coincidence of the positive timing pulse with the positive code pulse at the two inputs of the coincident gate 160 triggers the tube into conduction and registers a pulse in its output. Although the positive "on" condition of the code element A is applied simultaneously to each of the second control grids 168 of the coincident gates 160, 161, 162, 163 and 164, the absence of a timing pulse at the first control grid 167 of gates 161, 162, 163, and 164 prevents pulses from being registered in the output of these circuits. One cycle later, however, the positive timing pulse will be advanced by counter circuit 125 and applied, after differentiation, to the control grid 167 of coincident gate 161. An "on" condition for code unit B with the presence of a timing pulse at coincident gate 161 will result in a pulse at the anode 165 of gate 161. Gates 160, 162, 163, and 164 will remain non-conductive due to the absence of a timing pulse. Three and one-half cycles after actuation of the timing source 100 by the starting impulse, the positive pulse produced by the linear counter will have been advanced to counter circuit 129 and applied to gate 162. An "off" condition for code element C, although a timing pulse is present at gate 162, results in no output signal at the gate 162 due to the absence of a required positive potential at the second control grid 168. This automatic probing operation proceeds very rapidly and after five and one-half cycles of the timing source whereupon a trigger pulse developed by the linear counter 125 has been applied successively to the five coincident gates, 160 to 164, reception of a code group which is coded "on, on, off, on, off," and which may be a pulse coded representation of the letter "J" will have caused a pulse to have been registered in the output of coincident gates 160, 161 and 163, whereas, gates 162 and 164 will have remained non-conductive throughout the cycle. The pulses produced in the output of the coincident gates 160, 161 and 163, and which appear on leads 177, 178 and 180 are essentially time positioned at the center of the particular code element time interval, as shown by Figs. 9K, 9L, and 9N, and are applied to the associated memory circuits.

The memory circuits 190, 191, 192, 193, and 194 collectively serve both to transform the serial representations of the code group to a parallel representation and to provide storage of the coded intelligence. As indicated by Fig. 3, the memory circuits 190 to 194 are identical and consequently, only one will be described in detail; corresponding components of each circuit will, where necessary, be denoted by similar reference numerals. Each memory circuit, such as circuit 190, comprises two electron tubes, 196 and 197, with tube 196 including an anode 198, a control grid 201, and a cathode 202 and tube 197 also including an anode 203, a control grid 204, and a cathode 205. Anode 198 of tube 196 is cross-connected to the control grid 204 of tube 197 through a parallel connected resistor 206 and condenser 207, and anode 203 is cross-connected to the control grid 201 through a parallel connected resistor 208 and condenser 209. Anode potential is afforded the tubes 196 and 197 by connections to the potential source through a common lead 211 and load resistors 212 and 213, respectively. The cathodes 202 and 205 are connected to ground through a biasing network comprising a resistor 214 and a condenser 215. The control grid 201 is returned to ground through series resistors 216 and 217 and control grid 204 is similarly returned to ground and through series resistors 218 and 219. With each memory circuit connected in the described manner, it becomes readily apparent that each circuit is basically a symmetrical multivibrator circuit having two absolutely stable states. Each memory circuit can exist indefinitely in either of its two conditions and can be transferred from one state to the other by suitable triggering pulses, thus providing an indefinite memory of a previous event until triggered to a new condition. Indication of the status of each of the memory circuits may be provided by a neon tube 221 and a current limiting resistor 222 connected in series and together connected across the load resistor 212. The leads 177 to 181 connected to the output of the gates 160 to 164, respectively, as illustrated in Fig. 2 are continued in Fig. 3. The negative pulse appearing on the associated output lead 177 of coincident gate 160 signifying the presence of an "on" condition of the associated code element is coupled through a neon tube 223, and a blocking condenser 224 to the common terminal point of the grid return resistors 218 and 219. Coupling from the other gating circuits to the other memory circuits 191 to 194 may be similarly accomplished and as shown. The neon tube 223 serves to prevent any transients of short duration, spurious pulses that may be generated in the coincident circuits from reaching the memory circuits whereas, the blocking condenser prevents D. C. voltages from being applied to the memory circuit flip-flops. The common terminal point of the grid return resistors 216 and 217 associated with the tube 196 of each memory circuit is connected through a neon tube 225 and a limiting resistor 226 to a pulse to memory reset circuit, to be described hereinafter.

As stated hereinbefore in connection with the timing unit, the output of triode 74 which appears on the lead 101, and which is coincident in time with the leading edge of the starting impulse, is applied as a reset pulse to the memory circuits 190 to 194 via a pulse to memory reset circuit 227 interposed between the memory circuits and the circuit 52. The reset circuit 227 provides a short duration, negative triggering pulse to all memory circuits over a lead 228. The positive impulse from the circuit 52 is applied by the lead 101 to the input network of the pulse to memory reset circuit 227 which comprises a resistor 231 which is connected to ground and a condenser 232 and resistor 233 which cooperate to provide a differentiating action to the applied impulse. The resulting positive trigger pulse is applied to an amplifier tube 234 and appears as a negative pulse across a parallel connected load resistor 235 and condenser 236 in the output of the amplifier. This negative pulse is simultaneously impressed across the grid return resistor 217 of each memory circuit through the neon tube 225 and limiting resistor 236, thereby positively establishing the non-conductive condition of tube 196 and the corresponding conductive condition of tube 197. This assures that each of the memory circuits, 190 to 194, will be receptive to a negative pulse developed by the associated channelling circuits. Thus, it becomes apparent that the starting impulse preceeding the character code group is utilized through the circuit 52 and the pulse to memory reset circuit 227 to clear the memory circuits and set them in a condition responsive to the succeeding character code group. The operation of the memory circuits is more readily understood by assuming that the chain of the five code element pulses comprising the five element code is "on, on, off, on, off" whereupon a negative pulse is sequentially registered in the output circuits of the coincident gates 160, 161 and 163. These negative pulses are applied to the control grids 204, the tube 197 of memory circuits 190, 191 and 193 associated with the respective coincident gates. These triggering pulses, which signify "on" conditions of the particular code elements, effectuate a reversal of status of the particular memory circuits in a manner hereinbefore described in conjunction with the flip-flop circuits of the linear counter 125 and with tube 196 then conductive, a potential drop appears across the load resistor which is sufficient to ionize the neon tube, thereby visually indicating the condition of the particular code element. It, therefore, becomes apparent that the letter "J," which may be represented on "on, on off, on, off" code elements, sequentially reverses the status of memory circuits 190, 191 and 193 wherein they remain until the next succeeding starting impulse preceding the following code group arrives and recycles the operation. As illustrated in the timing diagram in Figs. 9P, 9Q, 9R, 9S and 9T, the potential appearing at the anode 203 of tube 197 goes positive with respect to its normal condition upon the application of the negative pulse from the coincident gates and remains in this condition during the remaining period of the complete code cycle. As described hereinbefore, the potential at the anode 198 of tube 196 is then driven negatively. A pair of output leads are associated with each of the memory circuits 190 to 194. Lead 237 is connected to the anode 203 and lead 238 is connected to the anode 198 of memory circuit 190, hence, in the quiescent condition or in the presence of an "off" condition for code element A, the voltage appearing on lead 237 is low, whereas the voltage appearing on lead 238 is high. Leads 241 and 242 carry the low and high potentials, respectively, from the circuit 191 when in the quiescent condition or in the presence of an "off" condition for code element B. Leads 243, 245, and 247 carry low potentials when code elements C, D, and E, respectively, are in the "off" condition, whereas leads 244, 246, and 248 carry high potentials under similar conditions for code elements C, D and E.

Cathode follower circuits 249 to 258, as indicated by the drawings, are utilized in five pairs in association with the five memory circuits 190, 191, 192, 193, and 194 and the two voltages developed by each of the memory circuits are coupled to the cathode follower circuits by leads 237, 238 and 241 to 248. The cathode followers are physically and functionally similar and the design is conventional and well-known. Now, assuming that the memory circuits have been reset to their quiescent conditions by the starting impulse, in a manner hereinbefore described, the tube 197 of each memory circuit will be conductive and its associated tube 196 non-conductive with low voltages applied to the cathode followers 249, 251, 253, 255, and 257 and high voltages applied to the cathode followers 250, 252, 254, 256, and 258. Therefore, in the quiescent or "off" condition, low potentials appear on leads 259, 261, 263, 265 and 267 and high potentials appear on leads 260, 262, 264, 266 and 268. Now, assuming that the code group representative of the letter "J" has been registered, the resulting reversal of conditions of the memory circuits 190, 191 and 193 will reverse the potential conditions appearing on the leads 259, 260, 261, 262, 265 and 266 associated with the aforementioned cathode follower circuits.

Referring now to Fig. 4, a selection control unit is shown which serves to transform the parallel representation of the code group as developed by the distributor unit into two unidirectional potentials. The selection unit includes coincident circuits 271, 272, 273, 274, 275, 276, 277, and 278 which are associated with the code element A and B channels and the letter-figure circuit to be described hereinafter and coincident circuits 281, 282, 283, 284, 285, 286, 287 and 288 which are associated with the code element C, D and E channels. Each of the aforementioned coincident circuits may be identical and is characterized by a plurality of input terminals and a single output terminal. Circuit 281, for example, includes diodes 291, 292 and 293 with said diodes comprising anodes 294, 295 and 296 and cathodes 297, 298 and 299, respectively. The anodes of each coincident circuit 271 to 278 and 281 to 288 are interconnected to associated single output terminals 301 to 308 and 311 to 321, respectively. Multiple input terminals to the coincident circuits are provided by the cathodes of each of said circuits which are distinctively connected to the output of the cathode follower circuits 249 to 258 by connecting said cathodes to the leads 259 to 268, which are continued from Fig. 3 to Fig. 4. The cathodes of coincident circuits 281 to 288 are distinctively interconnected with cathode followers 253 to 258 by connections to the leads 263 to 268. Cathodes of coincident circuit 281 are connected to the leads 264, 266, and 268, cathodes of coincident circuit 282 are connected to the leads 264, 266, and 267, cathodes of coincident circuits 283 are connected to the leads 264, 265, and 268, cathodes of coincident circuit 284 are connected to the leads 264, 265, and 267, cathodes of coincident circuit 285 are connected to the leads 263, 266, and 268, cathodes of the coincident circuit 286 are connected to the leads 263, 266, and 267, the cathodes of the coincident circuit 287 are connected to the leads 263, 265, and 268, and the cathodes of the coincident circuit 288 are connected to the leads 263, 265, and 267. An actuating potential is connected to each of the coincident circuits through a dropping resistor, such as resistor 320, associated with the circuit 281. This actuating potential is developed by a flip-flop circuit 321, illustrated in detail in Fig. 3 which is similar in construction and operation to the memory circuits 190 to 194. The flip-flop 321 similarly possesses two stable conductive conditions; the selection of which may be made by the application of suitable triggering impulses applied to input leads 322 and 323. Input lead 322 is connected to the pulse to memory reset circuit 227 hereinbefore described which assures the nonconductive condition of tube 196 of the flip-flop 321 before reception of each code group. The input lead 323 serves to interconnect the tube 197 of flip-flop 321 with the output of counter circuit 131 illustrated in Fig. 2 and the timed positive impulse delivered therefrom serves to reverse the state of flip-flop 321. The potential appearing at the anode of tube 197 is delivered by a lead 324 to a cathode follower 325 and appears as a positive impulse across load resistor 326. This positive impulse is then applied by a lead 327 to the coincident circuits 281 to 288 in parallel. The output terminal of a particular coincident circuit is activated when, and only when, all of the associated diodes are non-conductive. Hence, with the cathodes of said diodes associated with the circuit 281 connected in the manner hereinbefore described, a positive potential appears on terminal 311 when, and only when, code elements C, D and E are "off, off, off," respectively; on terminal 312 when, and only when, code elements C, D, and E are "off, off, on"; on terminal 313 when the conditions are "off, on, off"; on terminal 314 when the conditions are "off, on, on"; on terminal 315 when the conditions are "on, off, off"; on terminal 316 when the conditions are "on, off, on"; on terminal 317 when the conditions are "on, on, off"; and on terminal 318 when the conditions are "on, on, on."

As hereinbefore stated, the coincident circuits 271, 272, 273, 274, 275, 276, 277, and 278, which are associated with the code element A and B channels and the letter-figure circuit, are physically and functionally similar to the coincident circuits 281 to 288 with the diode plates of each coincident circuit being connected to the single, associated output terminals 301, 302, 303, 304, 305, 306, 307 and 308. The cathodes of each circuit are distinctively connected, however, to the cathode follower circuits 259, 260, 261 and 262 associated with the code element A and B channels and a pair of cathode follower circuits 330 and 331, shown in Fig. 3, which are responsive to the letter-figure circuit. A pair of leads 332 and 333 supply the high or low voltage, which appears at the output of the cathode followers 332 and 333, to the coincident circuits 271 to 278. The cathodes of coincident circuit 271 are connected to the leads 260, 262, and 332, cathodes of coincident circuit 272 are connected to the leads 260, 261, and 332, cathodes of coincident circuit 273 are connected to the leads 259, 262, and 332, cathodes of coincident circuit 274 are connected to the leads 259, 261, and 332, cathodes of coincident circuit 275 are connected to the leads 260, 262, and 333, cathodes of coincident circuit 276 are connected to the leads 260, 261, and 333, cathodes of coincident circuit 277 are connected to the leads 259, 262, and 333, and the cathodes of coincident circuit 288 are connected to the leads 259, 261, and 333. The same source of potential developed by the flip-flop circuit 321 and applied to the coincident circuits 281 to 288 in parallel is also applied to the coincident circuits 271 to 278 in parallel by the lead 327 and through a dropping resistor, such as 334, associated with each of said coincident circuits. A positive potential is applied to the output terminals 301 to 308 associated with the coincident circuits 271 to 278, when, and only when, the diodes associated with the particular circuit are non-conductive by virtue of the bias voltages impressed on the cathodes by the related memory circuit cathode followers 249, 250, 251, 252, and the letter-figure cathode followers 330 and 331.

Means for extending the 32 combinations afforded by the five element code group are provided by a letter-figure circuit comprising a letter gating circuit 336, a figure gating circuit 337, a pair of amplifiers 338 and 339, shown in Fig. 3, and a flip-flop circuit 340, also shown in Fig. 3, which cooperate in response to particular code groups to provide an additional 32 combinations, thus allowing interpretation and display of 54 distinct characters. The number of distinct characters which may be presented, although stated as 64, must be reduced by the number of codes that are required to operate the desired letter shift, figure shift, space shift, line reset and screen reset, each of which requires at least one code. Since the illustrative example employs a five-element code which requires shifting from the upper half of the matrix to the lower half of the matrix, available code spaces in each half must be reserved for the shifts and resets desired. Therefore, ten spaces in the matrix would be used for these operations, leaving only 54 available spaces for characters. Because only 54 spaces are available in the matrix, it would then be necessary to subtract ten code groups from the 64 distinct characters permitting display of only 54 distinct characters. However, the invention also contemplates the use of other number element codes including six-element codes. A six-element code would obviate the necessity of shifting from the upper to the lower half of the matrix. Then, of course, each of the stated operations would require only a single space on the matrix. It is understood that by utilizing a six element code group a total of 64 character code groups may also be interpreted, translated, and the proper character displayed on the screen of the charactron tube. The letter gating circuit is characterized by two input terminals 344 and 345 and a single output terminal 346 and includes an electron tube 347 which may contain a diode and a triode within the same envelope. As shown in Fig. 4, the tube 347 comprises an anode 348, a cathode 351, a control grid 352 to which the input terminal 344 is connected, and a diode plate 353 to which the output terminal 346 is connected. The anode is connected to a D.-C. source of potential (not shown), the cathode is connected to ground through a resistor 354, and the diode plate 353, in addition to being connected to the output terminal 346, is connected to the input terminal 345 through a dropping resistor 355. In operation, the letter gate 336 serves to produce a positive impulse on the output terminal 346 when, and only when, positive impulses are simultaneously present on the two input terminals 344 and 345. With a positive potential applied to the control grid 352 by the input terminal 344, the voltage appearing at the cathode 351 and providing the back bias on the diode section is raised sufficiently to prevent conduction of the diode section in the presence of a positive potential applied thereto by the input terminal 345. Consequently, with no current flow through the diode section of the tube, no voltage drop appears across the resistor 355 and the potential delivered by the input terminal 345 appears substantially unmodified on the output terminal 346. However, in the absence of a positive potential being applied to the control grid 352 by the input terminal 344, the voltage appearing at the cathode is low and insufficient to bias the diode section to non-conduction in the presence of a positive signal applied to the diode plate 353 by the input lead 345. Current then is allowed to flow through the dropping resistor 355, the diode section of the tube, and the resistor 354 thereby reducing the potential appearing on the output terminal 346 by the voltage drop appearing across the dropping resistor 355. Obviously, in the absence of a positive signal on the input terminal 345, no signal appears on the output terminal 346. It, therefore, becomes apparent that a positive impulse appears on the output terminal 346 when, and only when, a positive impulse simultaneously appears on the two input terminals 344 and 345. As shown in Fig. 4, the input terminal 345 is connected to the output terminal 318 of the coincident circuit 288 which produces an output only when the code elements C, D and E are "on, on, on," whereas the input terminal 344 is connected to the output terminal 304 of the coincident circuit 274 which produces an output only in the presence of "on, on," conditions for the code elements A and B and an "off" condition for the letter-figure circuit. Hence, a signal appears on the output terminal 346 associated with the letter gate 336 when, and only when, a character code group "on, on, on, on, on" is registered. The figure gate 337 is similar to the letter gate 336 and possesses two input terminals 356 and 357 and a single output terminal 358 and includes an electron tube, which like the tube 347, comprises an anode, a cathode, a control grid to which the input terminal 356 is connected, and a diode plate to which the output terminal 358 is connected. The anode is connected to a source of potential (not shown) and the anode circuit is completed by connecting the cathode to ground through a resistor. The diode plate is connected to the input terminal 357 which is coupled to the output terminal of the coincident circuit 284 and to which is applied a positive impulse when code elements C, D and E are "off, on, on," respectively. Input terminal 356 intereconnects the control grid of the tube 337 with the output terminal 304 of the coincident circuit 274 which produces an output in the presence of "on, on" conditions for the code elements A and B and an "off" condition for the letter-figure circuit. The operation of the figure gate 337 is identical with that described in connection with the letter gate 336 but due to the different connections of the input terminals 345 and 357, a signal appears on the output terminal 358 when, and only when, a character code group "on, on, off, on, on" is received.

The output terminals 346 and 358 associated with the letter gate 336 and figures gate 337, respectively, are coupled by leads 361 and 362 to the pair of amplifiers 338 and 339 shown in detail in Fig. 3. The amplifiers 338 and 339 are conventional units whose physical and functional characteristics are well-known to those skilled in the art. A positive impulse developed by the letter gate or figure gate in response to a predetermined code group is applied to the associated amplifier and appears inverted in the output. The output of the amplifier 338 is coupled through a capacitor 363 to one input terminal of the flip-flop circuit 340 and is also applied to the space deflection counter (to be hereinafter described) through a diode 364. The output of the amplifier 339 is coupled through a capacitor 365 to the other input terminal of the flip-flop 340 and is also applied to the space deflection counter through a diode 366. The flip-flop 340 is physically and operationally identical with the memory circuit 190 to 194 described in detail hereinbefore, and characteristically comprises two electron tubes 366 and 367. Either the tube 366 or 367 may be set to its conductive or non-conductive condition in response to triggering pulses developed by the amplifiers 338 and 339 and applied to the appropriate control grid, thereby establishing either high or low potentials at their respective anodes. The potentials appearing at the anode of the triode 336 are applied by a lead 368 to the cathode follower 330. The potentials appearing at the anode of the triode 367 are applied by a lead 369 to the cathode follower 331. Thus, in response to a predetermined letter code group, a positive impulse is developed by the letter gate 336 and appears on the output terminal 346. This positive pulse is amplified and inverted by the amplifier 338 and is then coupled to the control grid of the tube 336 of the flip-flop 340 and serves to assure a non-conductive condition of the triode 366 and a conductive condition of the triode 367. As a consequence, a high potential is established at the anode of tube 366 which is coupled by the lead 368 to the cathode follower 340, and appears as a high potential on the lead 332. A corresponding low potential appears at the anode of the tube 367 and is applied to the cathode follower 331 and appears as a low potential on the lead 333. Considering now the manner in which the coincident circuits 271 to 278 are connected to the leads 332 and 333 and their principle of operation as described hereinbefore, it becomes readily apparent that only the output terminals associated with the coincident circuits 271, 272, 273, and 274 may be activated after registration of a letter code group. In response to a predetermined figure code group a high potential appears at the output of the cathode follower 331 on lead 333 with a low potential at the output of the cathode follower 330 and on lead 332 due to establishment of a conductive condition in tube 366 and a non-conductive condition of tube 367 of the flip-flop 340 by the associated action of the figure gate 337 and the amplifier 339. Therefore, with conditions reversed and a high potenital appearing on lead 333 and a low potential on lead 332, only the output terminals associated with the coincident circuits 275, 276, 277, and 278 may be activated and it becomes apparent that the letter-figure gates in conjunction with their associated circuits provide means for selecting the activation of either of two sets of four coincident circuits whereas the code elements A and B provide the selection between individual coincident circuits of the set.

In Fig. 4, means are shown which, in conjunction with the coincident circuits 271 to 278 and 281 to 288, serve to transform the time coincident pulse coded information into two potentials which when applied to the selection plates 12 of the charactron tube establish the required electrostatic fields for positioning the electron beam upon a predetermined area of the matrix 13. In addition, means are provided for developing potentials which when applied to the deflection plates 14 of the charactron tube, produce electrostatic fields for directing the shaped electron beam to a predetermined position upon the target 15 irrespective of varying positions of the shaped beam due to the difference in position of the various character shaped openings in the matrix 13 through which the electron beam must pass to form successive characters. As mentioned hereinbefore, the charactron tube 10 as illustrated in Fig. 1, includes selection means 12 and deflection means 14. As shown in Fig. 8, said selection means comprise horizontal selection plates 375 and 376 and vertical selection plates 377 and 378 with said deflection means comprising horizontal deflection plates 381 and 382 and vertical deflection plates 383 and 384 as shown in Fig. 1 and in Fig. 8. Fixed potentials supplied by a source 385 are applied to horizontal selection plates 375 and vertical selection plate 377 whereas horizontal and vertical selection potentials developed by the circuits shown in Fig. 4 to be described, are applied to the other of said horizontal and vertical selection plates 376 and 378. These fixed potentials serve to establish electrostatic fields which, in the absence of selection potentials being impressed on the plates 376 and 378, cause the electron beam to be directed to an area in the upper-left corner of the matrix 13 which corresponds to the column one-row one position on the matrix. Then, by the application of only selection potentials to the plate 376, the electron beam may be made to step across row one of the matrix. Correspondingly, by the application of only selection potentials to the plate 378 when the beam is positioned in the 0, 0 position, the electron beam may be made to step down through column one of the openings established in the matrix. Thus, it becomes apparent that by impressing the proper horizontal and vertical selection voltages on the selection plates 376 and 378, the electron beam may be directed to any area on the matrix 13. Fixed voltages may also be supplied to the horizontal deflection plate 381 to the vertical deflection plate 383 to position the electron beam when located at the 0, 0 position on the matrix at the upper-left corner of the fluorescent screen 15. Horizontal and vertical deflection potentials developed by the circuits to be hereinafter described are applied to the deflection plates 381 and 383 to relocate the shaped electron beam at the reference position at the upper-left corner of the screen 15 when the position of the electron beam has been displaced from the 0, 0 position on the matrix by the application of selection potentials applied to the plates 376 and 378. Hence, these potentials serve to compensate for the distinct locations of the various character shaped openings in the matrix and cause successively selected characters to appear at the reference position on the screen and superimposed upon the preceding one.

Referring again to Fig. 4, which illustrates in detail one embodiment of the circuits which serve to transform the pulse coded information into the two selection potentials and the two deflection potentials, wherein separate elements are provided in a coordinating means for each of the 64 different letters, numerals, or related symbols afforded by the five element code group and the letters-figures circuit. Circuits elements 401 a to h, 402 a to h, 403 a to h, 404 a to h, 405 a to h, 406 a to h, 407 a to h, and 408 a to h are identical circuits. Circuits 401a, 401b, and 401h, 402a, and 408a and 408h are shown in detail to emphasize their similarity whereas the remaining circuits are shown in dotted block form. However, it is understood that each of the circuits is identical structurally and operationally whether shown in detail or merely represented by dotted blocks. The foregoing description relating to circuit 401h is applicable to the other circuits with each having two input terminals, such as 411 and 412, and four output terminals, such as 413, 414, 415, and 416, and including a tube 417 similar to the tube 347 associated with the letter gate 336. The anode is connected to a source of power (not shown) with the cathode being connected to ground through a resistor 418. The input terminal 411 is connected through a dropping resistor 421 to the diode plate and also to potentiometers 422, 423, 424, and 425, whereas the input terminal 412 is connected through a resistor 430 to the control grid of the tube 417. The output terminals 413, 414, 415, and 416 are connected to the potentiometers 422, 423, 424, and 425, respectively, through diodes 426, 427, 428, and 429. Four unidirectional potentials, which appear on the four associated output terminals, may be developed by any particular circuit in response to predetermined actuating conditions. Two of these potentials are applied to the selection plates 376 and 378 of the charactron tube and provide the means necessary to position the electron beam at any predetermined area on the character shaping matrix 13. The remaining two potentials are applied to the deflection plates 382 and 384 and serve to direct the shaped electron beam to the reference area at the upper-left corner of the fluorescent screen 15 by providing appropriate electrostatic fields which compensate for the different character locations within the matrix 13. The operation of these circuits is similar to the operation of the letter-figure gates 336 and 337, described hereinbefore; a voltage appears in the output, in this case across the potentiometers 422, 423, 424, and 425, only when positive potentials are simultaneously applied to both input terminals 411 and 412. The positive impulses which are applied to the input terminals 411 and 412 are derived from the coincident circuits 281 to 288 and 271 to 278, respectively, and appear on the respective output terminals thereof when, and only when, predetermined code elements are registered. A first group of eight circuits denoted generally by the reference numerals 401 a to h, is connected in parallel by interconnecting the output terminal 301 of coincident circuit 271 with the input terminals 412 of each circuit, a second group of eight circuits denoted by the numerals 402 a to h is connected in parallel by interconnecting the output terminal 302 of coincident circuit 272 with the input terminal 412 of each circuit, a third group of eight circuits 403 a to h is connected in parallel by interconnecting the output terminal 303 of coincident circuit 273, a fourth group of eight circuits 404 a to h is connected in parallel by interconnecting the output terminal 304 of coincident circuit 274 with the input terminal 412 of each of these circuits, a fifth group of eight circuits 405 a to h is connected in parallel by interconnecting the output terminal 305 of coincident circuit 275 with the input terminal 412 of each of these circuits, a sixth group of eight circuits 406 a to h is connected in parallel by interconnecting the output terminal 306 of coincident circuit 276 with the input terminal 412 of each of these circuits, a seventh group of eight circuits 407 a to h is connected in parallel by interconnecting the output terminal 307 of coincident circuit 277 with the input terminal 412 of each of these circuits, and a eighth group of eight circuits 408 a to h is connected in parallel by interconnecting the output terminal 308 of coincident circuit 278 with the input terminal 412 of each of these circuits. Input terminal, such as 411, of the 64 circuits is associated with the coincident circuits 281 to 288, which as hereinbefore stated, are responsive to the eight possible combinations of the C, D, and E code elements. The output 311 of the coincident circuit 281 is applied in parallel to the input terminals 411 of the circuits 401a, 402a, 403a, 404a, 405a, 406a, 407a, and 408a; the output 312 of the coincident circuit 282 is applied in parallel to the circuits 401b, 402b, 403b, 404b, 405b, 406b, 407b, and 408b; the output 313 of the coincident circuit 283 is applied in parallel to the circuits 401c, to 408c; the output 314 of the coincident circuit 284 is applied in parallel to the circuits 401d to 408d; the output 315 of the coincident circuit 285 is applied in parallel to the circuits 401e to 408e; the output 316 of the coincident circuit 286 is applied in parallel to the circuits 401f to 408f; the output 317 of the coincident circuit 287 is applied in parallel to the circuits 401g to 408g; and the output 318 of the coincident circuit 288 is applied in parallel to the circuits 401h to 408h.

With the two input terminals 411 and 412 of each of the circuits being connected in the manner described, it becomes apparent that 64 different input combinations are provided in response to the 64 combinations in which the five element code group and letter-figure circuit may exist, and that one, and only one, of the 64 circuits is activated by a single code group. For example, the letter "J" represented by the code group "on, on, off, on, off" will activate the coincident circuit 274 by virtue of the "on, on" conditions for the code elements A and B and activate the coincident circuit 283 due to the "off, on, off" conditions for the code elements C, D and E. As illustrated in Fig. 4, the circuit 404c is the only circuit whose input terminals 411 and 412 are actuated by the coincident circuits 274 and 283. The letter M, which may be represented by the code group "off, off, on, on, on" will actuate the coincident circuit 271 due to the "off, off" conditions for code elements A and B and as a result of the "on, on, on" conditions for the code elements C, D, and E the coincident circuit 288 will be activated and produce a positive impulse to the input terminal 411 of the associated circuits 401h to 408h. The coincidence of positive impulses on the input terminals 411 and 412 of the circuit 401h produces a voltage across the four parallel connected potentiometers 422, 423, 424, and 425; an adjustable fraction of which appears at the output terminals 413, 414, 415, and 416, respectively. The diodes 426, 427, 428, and 429 associated with the four output terminals serve to isolate each of the 64 circuits since four common leads (not shown) interconnect the corresponding output terminals of each of the 64 circuits. For purposes of clarification, the four common leads, which interconnect the corresponding output terminals of each of the 64 circuits and over which the four unidirectional potentials are applied to the charactron tube, have been omitted from the drawing of Fig. 4. The potentials appearing at the output terminals 413 and 414 supply the necessary selection potentials to the horizontal and vertical selection plates 376 and 378, respectively, to align the electron beam with the proper opening in the matrix 13 of the charactron tube. As stated hereinbefore, the character shaped openings in the matrix may be arranged in lineal columns and rows with the configuration, in this instance, being eight rows and eight columns. Thus, assuming the letter, numeral, or symbol openings in the matrix of the tube were arranged in the same relative position as the letters, numerals, or symbols illustrated in Fig. 4, then by suitable settings of the potentiometers 422 associated with the first group of eight circuits comprising the circuits 401a, 402a, 403a, 404a, 405a, 406a, 407a, and 408a equal voltages are produced at the ouput terminal 413 which when amplified and applied to the horizontal selection plate 376 cause the electron beam to be directed to the first row of openings in the matrix. Potentiometers 422 associated with the second group of eight circuits comprising the circuits 401b, 402b, 403b, 404b, 405b, 406b, 407b, and 408b are similarly set to produce equal voltages at the output terminal 413 which when amplified and applied to the horizontal selection plate 376 of the charactron tube cause the electron beam to be aligned with the second column of openings in the matrix 13. Voltages are produced at the output terminal 413 of the third group of eight circuits 401c to 408c which when amplified and applied to the horizontal selection plate 376 cause the beam to be directed to the third column of openings in the matrix. Thus, it becomes apparent that in this embodiment eight horizontal selection voltages may be produced and any one of which when applied to the horizontal selection plate 376 of the charactron tube directs the electron beam to the selected columns of openings of the eight available. The selection of a particular group of the eight provided is controlled by the code elements C, D and E and the voltage produced at the associated output terminal 413 when applied to the horizontal selection plate 376 directs the electron beam to the selected column of openings in the matrix 13.

Direction of the electron beam to the proper row of openings in the character shaping matrix in response to the received code group is accomplished in essentially the same manner as that described in conjunction with column selection. Output terminal 414 of each of the 64 circuits supplies the vertical selection voltages. With eight rows of openings in the matrix of the charactron tube, eight different voltages, which are capable of aligning the electron beam with each row, are available to the vertical selection plate 378. Corresponding setting of the potentiometers 414 associated with the eight circuits 401a to 401h supply the proper voltage to the output terminal 414 to align the beam with the first row of shaped openings in the matrix. Regardless of the circuit which is activated by the existence of a coincident of positive impulses on its input terminals 411 and 412, substantially equal selection voltages are applied to the vertical selection plate 378. In response to assigned code groups, substantially equal vertical selection voltages capable of deflecting the electron beam to the second row of openings appear on the output terminal 414 of the eight circuits 402a to 402h. Actuation of one of the eight circuits 403a to 403h furnishes the appropriate voltages for directing the electron beam to the third row of openings in the matrix 13. The circuits 404a to 404h effectuate beam alignment with the fourth row, circuits 405a to 405h the fifth row, circuits 406a to 406h the sixth row, circuits 407a to 407h the seventh row, and circuits 408a to 408h the eighth row. The magnitude of the horizontal and vertical selection voltages developed hereby are dependent upon the size of the matrix and the spacing between successive rows and columns, as well as the physical characteristics of the selection plates, the spacing therebetween, and the beam voltage. However, it has been found that with a matrix .625 inch x .625 inch comprising eight rows and eight columns, horizontal and vertical selection voltages of approximately 0, 10, 20, 30, 40, 50, 60, and 70 volts provide adequate selection of any one of the 64 openings.

The remaining two output terminals 415 and 416 provide the voltages, which when applied to the horizontal and vertical deflection plates 382 and 384, respectively, relocate the shaped electron beam at a predetermined reference position on the fluorescent screen 15 regardless of the position of the shaped beam after passing through the matrix 13. The operation of potentiometers 424 and 425 and the diodes 428 and 429 of each circuit and the horizontal and vertical deflection plates 382 and 384 is similar to the operation of the potentiometers 422 and 423 and the diodes 426 and 427 of the same circuit in association with the horizontal and vertical selection plates 376 and 378. Actuation of a particular circuit by virtue of a coincidence of positive impulses applied to the input terminals, such as 411 and 412, thereof produces voltages at the output terminals 415 and 416 which are a function of the location of the particular character in the matrix and bear a direct relation to the voltages appearing at output terminals 413 and 414 which provide the horizontal and vertical components for selection. For example, reception of the code group representative of the letter "J" will result in the actuation of the circuit 404 as described hereinbefore, and provide at the output terminals 413, 414, 415, and 416 voltages appearing at the horizontal and vertical selection plates 376 and 378 and the horizontal and vertical deflection plates 382 and 384 after amplification of approximately 20, 30, 165, and 220 volts, respectively. Reception of the code group representative of the letter "T" will result in the actuation of the circuit 401c and provide at the output terminals 413, 414, 415 and 416 voltages, when applied to the horizontal and vertical selection and deflection plates, of approximately 0, 20, 110, and 0 volts, respectively.

In Fig. 5 another embodiment of the selector control unit is illustrated, which serves to transform the parallel representation of the code group, as developed by the aforedescribed memory circuits 190 to 194 of the distributor unit, into two unidirectional potentials. Said selector control unit comprises six gating circuits, 440, 441, 442, 443, 444, and 445, an oscillator (not shown), and two accumulator networks, 446 and 447. Gating circuits 441, 442, 443, 444, and 445 are operatively employed with the five memory circuits 190, 191, 192, 193, and 194, respectively, whereas the gating circuit 440 is associated with a letter-figure memory circuit 340. One of the aforementioned unidirectional potentials is controlled in magnitude by the "on-off" conditions of code elements A and B and the letter-figure circuit, whereas the other unidirectional potential is governed by the "on-off" conditions of code elements C, D and E. Each of the gating circuits 440 to 445 is functionally and physically similar and includes an electron tube 450 which comprises an anode 451, a screen grid 452, a second control grid 454, a first control grid 453, and a cathode 455. Corresponding components of each circuit are assigned the same reference numerals. Anode potential is afforded the tube 450 by a potential source (not shown) which is connected to the anode 451 through a primary winding 456 of a transformer 457. The primary windings employed with each of the gating circuits are functionally similar and preferably have an equal number of turns. The first control grid 453 of each circuit is both returned to ground through a grid return resistor 458 and connected by a lead 459 to the oscillator, which may be of a conventional design and well-known to those skilled in the art. The second control grid 454 of each gating circuits 440 to 445 is interconnected with the associated memory channel cathode followers 249, 251, 253, 255, 257 and 331 shown in Fig. 3 by coupling said control grids 454 to the leads 259, 261, 263, 265, 267 and 333, respectively, which carry the high and low voltages appearing in the output of the cathode follower circuits. The leads 259, 261, 263, 265 and 267 are at low potential conditions in the quiescent condition, that is, when an "off" condition is registered for the associated code element, and at a high potential when an "on" code element appears in the associated channel. The lead 333 is at a low potential after reception of a letter code group and at a high potential after reception of a figure code group.

The sinusoidal output generated by the master oscillator is continuously applied in parallel over the lead 459 to the first control grids 453 of the five gating tubes 441 to 445 and also to the letter-figure gating circuit 440. The unidirectional potentials which appear at the cathodes of the memory circuit cathode followers in Fig. 3 in the presence of an "off" condition of the particular code element and which are impressed upon the second control grids 454 of the associated gating tubes are insufficient to allow conduction of the tube 450 even though the sinusoidal oscillator voltage is applied to the first control grid 453. An "on" condition of the particular code element, as described hereinbefore, appears as a positive impulse at the output of the associated cathode follower and is transferred to the second control grid by one of the leads 259, 261, 263, 265 or 267. At the instant the second control grid 454 is driven positively, the tube 450 is allowed to become conductive and an alternating voltage, as the result of the oscillator voltage being applied to the first control grid 453, appears across the primary winding 456 of the transformer 457. These alternating currents which flow through the primary windings 456 induce voltages in either of the two accumulator networks 446 or 447. Accumulator network 446 comprises secondary windings 462, 463, and 464 and a rectifying element 465 which includes a cathode 466 and an anode 467, and network 447 comprises secondary windings 468, 469 and 470 and a rectifying element 471 which also includes a cathode 472 and an anode 473. The step-up factor of windings 468, 469 and 470 are in the relationship of four, two, and one, respectively, thus establishing predetermined voltages in the relationship of four, two, and one in the presence of "on" conditions for the code elements C, D and E. Similarly, the step-up factor of the windings 468, 469 and 470 are in the relationship of four, two, and one, respectively. The windings 462, 463, and 464 are serially connected in a manner to be series aiding such that the individual voltages which appear across each winding are additive. Windings 468, 469, and 470 of accumulator network 447 are similarly interconnected to be series aiding and also provide additive potentials. Thus, the individual voltages which appear across each winding of the two networks are additive. The winding 464 and the winding 468 are separately connected to the anodes 467 and 473 of the rectifiers 465 and 471, respectively. The cathodes 466 and 472 are connected in any suitable manner to a pair of conventional filter circuits 475 and 476, the outputs of which appear on the leads 477 and 478 which are connected to vertical and horizontal selection amplifiers 479 and 480, respectively. The outputs of the filters 475 and 476 are also connected to a pair of amplifiers 483 and 484, the outputs of which are applied to the leads 485 and 486 which are connected to the vertical and horizontal deflection amplifiers 487 and 488, respectively.

Operation of the selector control unit is more readily understood by assuming that the aforementioned memory circuits 190 to 194 of the distributor unit have been cleared after the reception of a letter code group and rendered receptive by the application of the negative triggering pulse to the control grid 201 of tube 196. This is the condition which exists after reception of a starting impulse. The low potentials appearing at the leads 259, 261, 263, 265, 267 and 333 and which are coupled to the second control grids 454 of the associated gating circuits 440 to 445 are of insufficient magnitude to allow conduction of the gating tubes. Hence, the voltages induced into accumulator networks 446 and 447 must be zero and the only electrostatic field which appears between the horizontal and vertical pairs of selection and deflection plates shown in Fig. 8 is that due to the fixed unidirectional potentials supplied by the source 385 to the opposed selection and deflection plates 375, 377, 381 and 383 which under such conditions, direct the electron beam to the 0, 0 position on the matrix 13, and the upper-left corner of the fluorescent screen 15. Each gating circuit, in the presence of an "on" condition for its assigned code element, develops across its associated secondary winding a predetermined potential magnitude, whereas, an "off" condition is registered by each code unit gating circuit as a zero output potential. Considering the "on" or "off" conditions in which each code element may be represented and the normalized predetermined potential relationships of four, two, and one, for code units C, D and E, respectively, eight normalized additive potential combinations, zero through seven inclusive, may be applied to the horizontal selection plate 376. These additive potential combinations, when amplified and applied to the horizontal selection plate 376 in the sequence zero through seven, sequentially align the electron beam with the eight successive columnarly displaced openings within the matrix 13. It is then apparent that selection of any particular column may be made by application of the proper summation potential to the horizontal selection plate 376. Orientation of the electron beam for proper row selection is accomplished in a manner similar to that of column selection, however, the normalized additive potential combinations appearing across secondary windings 462, 463, and 464 of accumulator network 446 and which are derived from the gating circuits 440, 441 and 442 associated with the letter-numeral discriminator and code units A and B, respectively, are applied to the vertical selection plate 378. As mentioned above, the voltages appearing across the secondary windings 462, 463, and 464 in the presence of an "on" condition the letter-numeral discriminator or for the particular code element are in the relationship of four, two, and one, respectively, and as in the case of columnar selection, eight additive potential combinations, zero through seven inclusive, may be applied to the vertical selection plate 378. Now, assuming that a letter "J," which may be represented by "on, on, off, on, off" conditions for code units A, B, C, D, and E, respectively, is received and registered by the distributor unit. The condition of the memory circuits 190, 191, and 193, as hereinbefore described, is reversed and high positive potentials are instantaneously applied by the leads 259, 261, and 265 to the associated gating circuits 441, 442 and 444 of the selector control unit. The magnitude of these potentials is sufficient to effectuate triggering of the gating tubes and with the oscillator voltage applied in parallel to the first control grid 453 of each of the tubes 450, an alternating voltage appears across the associated primary windings 456. Considering initially the selection of the correct row of openings within the matrix 13 wherein code elements A and B afford the required information, the voltages induced in secondary windings 463 and 464 of accumulator network 446 have, as a result of their individual step-up factors, predetermined normalized magnitudes of two and one. With the windings 463 and 464 being connected to be series aiding, the alternating voltages are additive and a normalized voltage magnitude equal to three is produced. After rectification by the diode 465 and suitable filtering by filter circuit 475, the resulting unidirectional voltage is applied via the amplifier 480 to the vertical selection plate 378 which establishes the required electrostatic field for positioning the electron beam upon row 3 of the matrix 13. As hereinbefore stated, code elements C, D and E may be utilized for the desired columnar selection, which in the case of the letter "J" are "off, on," and "off," respectively. Since code element D is the only element of the three columnar selection elements exhibiting an "on" condition, the only potential induced in accumulator network 447 is that which appears across the secondary winding 469. With its normalized step-up factor of two, as distinguished from four and one which are assigned secondary windings 468, and 470, the unidirectional voltage applied to the horizontal selection plate 376 after rectification and amplification causes the electron beam to be aligned with row 2. Actually, row-column selection is accomplished simultaneously and it becomes apparent that the electron beam in the above example is directed to the coordinate area 3, 2 which is the area occupied by the J-shaped opening in the matrix. Assume now that the letter "T" is received which may be pulse coded "off, off, off, off, on." As stated, the row coordinate is dictated by the reception of a letter or a figure code plus the "on-off" conditions of code units A and B, which in this example, will yield a predetermined row voltage magnitude of zero plus zero plus zero, which maintain the electron beam at the 0, 0 position on the matrix 13. The columnar voltage magnitude, which is controlled by the conditions of code units C, D and E, will yield in this case, a voltage magnitude of zero plus zero plus one, which will effectuate alignment of the electron beam with column one, which is the area occupied by the T-shaped opening.

In the event a numeral or related symbol code group is received as distinguished from a letter code group, this code group will be preceded by a characteristic identification code which will reverse the status of the letter-numeral flip-flop 340 described hereinbefore, which, ultimately in turn, triggers the gating circuit 440 into conduction in a manner identical with the other gating circuits employed with the individual code elements. Means for translating the assigned letter or figure identification code, which precedes the actual representative codes, into actuating impulses are afforded by a pair of coincident circuit 492 and 493. As illustrated in Fig. 5, circuit 492 comprises five diodes, one assigned to each code element, which include anodes 494, 495, 496, 497, and 498 and cathodes 501, 502, 503, 504 and 505. Circuit 493 similarly comprises five diodes which include anodes 506, 507, 508, 509, and 510 and cathodes 511, 512, 513, 514, and 515. The circuits 492 and 493 are essentially multiple input-single output devices with five cathodes of each circuit being distinctively connected to the leads 259 to 268 to back bias the diodes beyond cut-off when, and only when, the assigned code group is received and registered in the distributor unit. The cathodes 501 to 505 of circuit 492 are connected to the leads 259, 261, 263, 265, and 267 whereas the cathodes 511 to 515 are connected to the leads 259, 261, 264, 265, and 267. The figures code which may be represented by the conditions "on, on, off, on, on" and the letters code by conditions "on, on, on, on, on" and from the operation of the memory circuits 190 to 194 described hereinbefore high potentials will appear on the leads 259, 261, 264, 265, and 267 in the presence of a figure identification code and high potentials will appear on leads 259, 261, 263, 265, and 267 in the presence of a letter identification code. Registration of any other code group will cause one or more of the aforementioned cathodes to be at a low potential. The anodes 494 to 498 of the circuit 492 are connected in parallel through a dropping resistor 516 to the lead 327, which is interconnected to the cathode follower circuit 325 shown in Fig. 3. The positive impulse delivered over the lead 327 via the cathode follower 325 is generated by the flip-flop circuit 321 after registration of the code group in the five memory circuits 190 to 194 in a manner hereinbefore described. Referring again to Fig. 5, output terminals 518 and 519 are associated with the circuits 492 and 493, respectively, and the positive impulse applied to the parallel connected anodes of each circuit over the lead 327 appears substantially unmodified at said output terminals 518 or 519 when the appropriate code group has been registered in the memory circuit and the corresponding combination of high potentials appear on the leads to which the cathodes are connected. For example, reception and registration of a figure code, "on, on, off, on, on" will produce high potentials on the cathodes 511 to 515 of the circuit 493 which will be of sufficient amplitude to prevent conduction of the diodes of said circuit and the positive impulse will appear unmodified on the output terminal 519. In response to the figures code the cathodes 501, 502, 504, and 505 of the letters circuit 492 will also be biased above the positive potential applied to their associated anodes to prevent conduction, but to the cathode 503 will be impressed a low voltage which appears on the lead 263 in the presence of an "off" condition for the code element C, and upon application of the positive potential on the lead 327 the diode will become conductive with substantially the entire voltage appearing across the resistor 516. Hence, the substantially zero voltage appears at the output terminal 518. It is apparent that upon registration of a letters code group the reverse situation prevails and a triggering pulse will appear on the terminal 518 associated with the letters circuit 492 with substantially zero signal appearing on the terminal 519 of the figures circuit 493. The terminals 518 and 519 are connected to the input terminals 361 and 362 of the amplifier circuits 338 and 339 illustrated in Fig. 3. The operation of the amplifier 338 and 339, the flip-flop 340, and the cathode followers 330 and 331 whereby high or low potentials are supplied to the leads 332 and 333 in response to triggering signals applied to the leads 361 and 362 has been described hereinbefore. From the foregoing description it becomes apparent that the figures code group produces a high potential on the lead 333 and this condition remains until a letters code is registered which causes the flip-flop 340 to reverse its conductive conditions and produce a low voltage on lead 333 until a subsequent reversal occurs by virtue of a figures code group. The high potential appearing on the lead 333 as the result of a figures code will trigger the gating circuit 440, shown in Fig. 5, into conduction in a manner identical with the other gating circuits. The oscillator voltage, which is continuously applied to the first control grid 453 of the gating circuits 440 to 445, appears as in the case of the individual code elements, with amplified magnitude across the primary winding 456. The normalized step-up factor of secondary winding 462, as stated above, is four and when rectified, filtered, amplified, and applied to the vertical selection plate 378, establishes an electrostatic field which deflects the electron beam down four rows to the coordinate area 4, 0. Code elements A and B then combine in their various combinations to afford numerical or related symbol selection in an identical manner as described in conjunction with letter selection. It, therefore, becomes apparent that the reception of figures or related symbols, preceded as they are by identifying code groups, causes the electron beam to be shifted down four rows. This result is similar to the shift key function of a conventional typewriter.

Also, in Fig. 5 is illustrated means for developing the required switching voltages, in response to identifiable code groups, for automatically performing functional operations, such as screen reset, line reset, and line feed.

Said means comprise circuits 520, 521, and 522 which are associated with the screen reset, line reset, and line feed functions, respectively, with the circuit 520 including a single output lead 523 and multiple input leads 524, 525, 526, 527 and 528, the circuit 521 including a single input lead 529 and multiple input leads 530, 531, 532, 533, and 534, and the circuit 522 including a single input lead 535 and input leads 536, 537, 538, 539, and 540. The circuits 520, 521, and 522 are physically, functionally, and operationally similar to the letters circuit 518 and the figures circuit 519 hereinbefore described, however, the cathode input leads associated with each circuit are characteristically connected to the leads 259 to 268 and, therefore, the circuits produce output triggering pulses in response to three distinct code groups. The cathode input leads of the circuit 520 are connected to the leads 260, 262, 264, 266, and 268 and a positive impulse is produced at the output terminal 523 in response to the code "off, off, off, off, off." The cathodes of the circuit 521 are connected to the leads 260, 261, 264, 266, and 268 and a triggering pulse is developed on the output lead 529 when the code "off, on, off, off," is received. The cathodes 536 to 540 of the circuit 522 are connected to the leads 260, 262, 264, 265, and 268 which makes the circuit responsive to the code group "off, off, off, on, off." This code upon being registered in the memory circuits 190 to 194 and followed by the impulse from the flip-flop 321 over lead 327, develops a positive triggering signal on the output lead 535. The output leads 523, 529, and 535 are applied to the deflection unit, illustrated in Figs. 6 and 7 which will be described hereinafter, and for purposes of clarification, further description of the screen reset circuit 520, the line reset circuit 521, and the line feed circuit 522, will be made in conjunction with the deflection unit. The operation of line reset, line feed and the accompanying screen reset as described, is accomplished by the circuits 520, 521 and 522. These circuits, as has been stated, are functionally and operationally similar to the letters and figures circuits 518 and 519, respectively. Upon resetting of the counters associated with the line reset and screen reset, the obliteration of the characters stored on the screen of the tube becomes a function of the screen retentivity and the speed with which characters are displayed. Therefore, as is well known in the art, the desired decay characteristics of screens, such as phosphor, may be chosen by a man skilled in the art to keep at a minimum the possibility of obliterating the characters displayed.

The space deflection unit serves to provide means for progressively spacing and lineally positioning successive characters upon the fluorescent viewing screen 15 by developing a stepping voltage which when applied to the deflection plate 382 of the charactron tube, establishes the required electrostatic fields. The space deflection unit, as illustrated in Fig. 6 comprises a gating circuit 545, a deflection counter 546 including bistable circuits 547, 548, 549, 550 and 551 and circuits associated respectively therewith denoted generally by reference numerals 552, 553, 554, and 555. As mentioned hereinbefore in the description of the timing unit, the terminating impulse which is applied to the timing source 100 and effectively terminates the timing cycle is simultaneously applied both to the pulse to memory reset circuit 227 and by the lead 101 to the gating circuit 545 which includes an electron tube 560 comprising an anode 561, a suppressor grid 562, a screen grid 563, a control grid 564, and a cathode 565. Anode current is afforded by connecting the anode 561 to the power source (not shown) through a load resistor 566 and the output circuit is completed by connecting the cathode 565 directly to ground. The screen grid 563 is supplied its unidirectional voltage by a connection to the power source through a dropping resistor 567. The suppressor grid 562 is maintained at essentially zero potential by the action of a source of positive potential (not shown) and resistors 568 and 569 being applied to the grid 562 in opposition to a negative source of voltage (not shown) through a resistor 570. To prevent positive potentials being applied thereto, the grid 562 is connected to ground through a diode 571.

Where letters, figures, and functional operations are represented by code groups which are similar except for the assigned coding to the codes representing the letters or figures themselves, means for preventing the deflection unit from developing a spacing signal by reception of a letter, figure, or operational code group should be provided. Thus, a lead 574 is connected to the output of the amplifiers 338 and 339 through the pair of diodes 364 and 336, as illustrated in Fig. 3, and couples a blocking signal to the grid 562 of the gating circuit 545 upon registration of either a letter or figure identification code group. For similar purposes, a diode 575 interconnects the suppressor grid 562 of the gating circuit 545 with the output terminals 523, 529, and 535 associated with the screen reset, line reset, and line feed circuits 520, 521 and 522, shown in Fig. 5. Then, upon reception of one of the three functional operation code groups, the gating circuit is also blocked and consequently, no spacing pulse may be transferred to the circuit 547. Now, assuming that the received code group is representative of a character or related symbol as distinguished from one of the aforementioned functional code groups, the suppressor grid 562 of the gating circuit is maintained at essentially zero potential and unblocked. The terminating impulse, mentioned hereinbefore, is generated upon completion of the timing cycle and signifies the reception and registration of a code group, and when applied over the lead 101 to the gating circuit 545, causes a pulse to be developed in the output thereof which is applied to the trigger circuit 547. The circuit 547, as well as the circuits 548, 549, 550, and 551 of the deflection counter 546 include an electron tube comprising within a single envelope, two triodes 576 and 577, with triode 576 having an anode 578, a control grid 579, and a cathode 580, and with triode 577 having an anode 581, a control grid 582, and a cathode 583. Cathodes 580 and 583 are interconnected and together are connected directly to ground. Anode 578 is connected to a source of power through a resistor 584 and is also connected to the control grid 582 of tube 577 through a parallel network including a resistor and condenser. Anode 581 is connected to a source of power through resistor 585 and is also cross-connected to the control grid 579 of tube 576 by a similar network including a resistor and condenser. The control grid 582 is connected to a negative source of voltage (not shown) through a resistor 587. The control grid 579 is connected also to the negative source of voltage through a resistor 588 and a switch 589 which is normally closed thereby affording a negative bias to the control grid 579. This flip-flop configuration possesses two conductive conditions of stable equilibrium. One condition exists when tube 576 is conductive while tube 577 is cut-off and this will hereinafter be termed the zero condition; the other condition exists when tube 577 is conductive and tube 576 is cut-off and this will hereinafter be termed the one condition. Each circuit will remain in either of the two conditions until a suitable signal is applied which will reverse the established states. The input triggering signal for each circuit, as illustrated in Fig. 6, is supplied by the preceding circuit by interconnecting both the control grids 579 and 582 through a condenser 592 to the anode 578 of tube 545 of the preceding circuit. The gating circuit 545 supplies the triggering signal for the circuit 547. In the initial or cleared condition of the deflection counter 546, each of the circuits 547 to 551 are in the zero condition. The switching of any subsequent trigger circuit from either condition to the other occurs when a negative pulse is applied simultaneously to the control grids 579 and 582 of its tubes. The circuits 547 to 551 are arranged so that the circuits are non-responsive to positive pulses of equal amplitude to that of the negative pulses. In operation, the initial positive terminating pulse, which signifies reception and registration of the first character code group, is applied to the gating circuit 545 which produces a negative output pulse which is applied simultaneously to the control grids of the circuit 547. The application of this negative pulse causes the circuit to switch to its one condition and a positive pulse appears at the anode 578 of tube 576. This positive pulse is simultaneously applied by a lead 593 via resistor 594 to a diode 595 and also to the circuit 548, the conductive conditions of which remain unchanged. The application of a second pulse to the gating circuit 545 causes a negative pulse to be applied to the tubes 576 and 577 and causes circuit 547 to switch to the zero condition. The voltage appearing at the anode 578 is thereby reduced and this negative pulse is applied to the circuit 548 which changes the conductive conditions of the circuit to the one condition. The positive impulse appearing at the anode 578 of circuit 548 is coupled through a neon tube 596 to the associated circuit 552. The third pulse applied to the gating circuit 545 causes the trigger circuit 547 to switch to the one condition. This switching has no effect on the condition of circuit 548 since it is a positive pulse which is transferred from the anode 578 of the non-conducting tube 576 to the control grids of circuit 548. Thus, circuits 547 and 548 are in their one conditions whereas circuits 549, 550, and 551 remain in the zero state. The fourth pulse applied to the gating circuit switches circuit 547 to the zero condition which, in turn, switches the circuit 548 from the one to zero condition which causes a negative pulse to be impressed upon the control grids of circuit 549. This, in the same manner as in the preceding circuits, causes a reversal of conductive conditions in circuit 549 from zero to one and couples a positive pulse to the associated circuit 553. After reception of the fifth character code group resulting in a fifth pulse being coupled to the gating circuit 545, circuit 547 is switched to its one condition. The circuit 548 remains zero, circuit 549 remains one, and circuits 550 and 551 remain zero. Therefore, positive potentials are applied to the diode 595 and circuit 553 with negative potentials applied to the circuits 552, 554, and 555. It now becomes apparent that positive voltages are applied to the circuits 552 to 555 from the associated trigger circuits 548 to 551 when the trigger circuit is in its one state. Trigger circuit 547 is switched to the one condition on the odd number of pulses supplied by the gating circuit. Trigger circuit 548 is switched to its one condition every second pulse from the gating circuit. Trigger circuit 549 is switched to the one state upon the application of every fourth pulse, trigger circuit 550 every eighth pulse, and trigger circuit 551 every sixteenth pulse. Upon the application of the 32nd pulse from the counter gating circuit, the deflection counter 546 is returned to its initial conditions, and a pulse is applied to a lead 600 thereby signifying the reception of 32 character code groups. The space deflection unit provides for spacing and positioning 32 characters per line upon the fluorescent screen 15 of the charactron tube, but it is understood that the invention is not limited thereby. By adding additional trigger circuits with similar connections, the capacity may be readily increased.

The positive potentials developed by the trigger circuits 547 to 551 when in their one conditions are coupled to the diode 595 and the circuits 552 to 555 which develop predetermined potentials proportional to the count registered by the trigger circuits. These potentials are then applied via the amplifier 488 to the horizontal deflection plate 382 of the charactron tube. Each of the circuits 552 to 555 is similar and comprise a tube 602 including an anode 603, a screen grid 604, a second control grid 605, a first control grid 606, and a cathode 607. Anode current is afforded the tube by the power source which is connected to the anode 603 through the primary winding of a transformer 608. The output circuit is completed by connecting the cathode 607 to ground through a resistor 609 and by pass condenser 610. The first control grid 606 is both returned to ground through a grid resistor 611 and coupled by a condenser 612 to a lead 613 connected to a master oscillator denoted generally by the reference numeral 614, which is of conventional design and well known to those skilled in the art.

As hereinbefore stated, when the space deflection unit is in its cleared condition the circuits 547 to 551 are set in their zero states, and the voltages applied to the circuits 552 to 555 are low which prevent conduction of the tubes 602. Now assume that the first character code group has been received, the selection cycle has been completed, and a spacing pulse is applied to the gating circuit 545. The trigger circuit 547 is switched to its one condition and a high, or positive, voltage is applied to the diode 595, which includes a cathode and an anode, the latter being connected directly to ground. Also applied to the diode is a negative voltage supplied by a power source (not shown) through a resistor 615, however, the resultant voltage applied to the diode 595 is positive when the trigger circuit 547 is in the one condition. The magnitude of this positive voltage is established in accordance with the deflection sensitivity of the charactron tube and is effective, when eventually applied to the horizontal deflection plate 382, to space and linearly position the displayed character one space to the right of the reference position. Upon reception of the second character code group and the application of a second pulse to the gating circuit 545, trigger circuit 547 is restored to its zero condition and trigger circuit 548 is switched to its one condition. This removes the positive potential from the diode 595 and causes a positive, or high, potential to be coupled from the trigger circuit 548 to the second control grid 605 of circuit 552 which overcomes the negative voltage and allows the tube to become conductive. With the oscillator signal permanently applied to the first control grid 606 of each tube of the circuits 552 to 555, a voltage appears across the primary winding of transformer 608 associated with circuit 552. The current flowing through the secondary of transformer 552 is rectified by a diode 616, the cathode of which is connected to a filter condenser 617 and through a resistor 618 to a potentiometer 619. Potentiometer 619 serves as a means for adjusting the magnitude of the unidirectional voltage appearing on output terminal 620 to assure proper deflection voltages which, when applied to the deflection plate 382 of the charactron tube, will direct the shaped electron beam two spaces to the right of the initial reference position. The output terminal 620 of circuit 552 is connected through a resistor 623 to the output terminal 624 of circuit 553, which is similarly connected to terminal 625 of circuit 554 through a resistor 626. The output terminal 626 of circuit 554 is connected, in turn, through a resistor 627 to the terminal 628 over which the unidirectional voltages developed by the space deflection unit 546 are applied to the charactron tube. Where beam deflection is a linear function of the voltage applied to the deflection plate, the voltage developed upon reception of the second character code group should be two times the voltage developed by the first. Assuming now that a third spacing pulse is applied to the gating circuit 545 of the space deflection unit, trigger circuit 547 is switched to its one state, trigger circuit 548 remains in its previous one condition and trigger circuits 549, 550 and 551 remain in their zero condition. Hence, the voltage applied to the diode 595 is switched from a low to a high condition. The diode 595 is non-conductive since the cathode thereof is at a higher potential than the anode and assuming the magnitude is 10 volts, this voltage will appear on the output terminal 628. However, since trigger circuit 548 is also in its one condition a potential of, for example, 20 volts will be developed at the output terminal 620 due to the action of circuit 552 alone, and the resultant voltage appearing on the terminal 628 will be 30 volts. As hereinbefore stated, the application of the fourth spacing pulse to the gating circuit 545 switches circuits 547 and 548 to the zero condition which causes trigger circuit 549 to be reversed to its one condition. This provides a voltage, in the manner hereinbefore described, at the output terminal 624, the magnitude of which may be set by the potentiometer to 40 volts. Since all other trigger circuits exist in the zero condition, the circuits 553, 554 and 555 are blocked, and the summation of the voltages developed by the diode 595 and the circuits 552 to 555 which appear at terminal 628 is in this example, 40 volts. The fifth spacing pulse applied to the gating circuit 545 by the timing unit sets trigger circuit 547 to its one condition and circuits 548 to 551 remain in their previous states, zero, one, zero, zero, respectively. This effectively adds the 10 volt potential which appears at the diode 595 to the 40 volt potential developed on the output terminal 624 and produces the desired 50 volt potential on terminal 628. It, therefore, becomes apparent that with the voltages appearing at the output terminals associated with the trigger circuit 547 and circuits 552 to 555 being in the relationship of 10, 20, 40, 80, 160, respectively, voltages from zero to 310 are available at the terminal 628 in accordance with the number of character code groups received and registered by the distributor unit.

In the exemplified embodiment of the space deflection unit, after the application of 32 spacing pulses, the circuits 547 to 551 are returned to the initial or cleared condition and a carry-over pulse is provided on the terminal 600. The carry-over pulse is applied to a line deflection counter 630, illustrated in Fig. 7, which comprises trigger circuits 631, 632, 633, 634, and 635, connected in cascade and conversion circuits associated respectively therewith and denoted generally by the numerals 636, 637, 638, and 639, which serve to translate a count to a proportional unidirectional voltage. The trigger circuits 631 to 635 may be identical with the trigger circuits 547 to 551 associated with the space deflection counter 546 illustrated in Fig. 6, and each of said circuits includes a pair of triodes 641 and 642 with triode 641 having an anode 643, a control grid 644, and a cathode 645 and with triode 642 having an anode 646, a control grid 647, and a cathode 648. Anode 643 is cross-connected to the control grid 647 of tube 641 through a parallel resistor and condenser, and anode 646 is cross-connected to the control grid 644 through a similar parallel resistor and condenser. The control grid 647 is connected by a lead 651 to the negative source of voltage (not shown) through a resistor 652 and control grid 644 is connected by a lead 653 also to the negative source of voltage through a resistor 654 and a switch 655 which is normally closed thereby supplying a negative bias to the grid 644. As mentioned in the description of the space deflection counter 546, the trigger circuits 631 to 635 possess two stable conductive conditions; one condition exists when tube 641 is conductive, termed the zero condition, whereas the other condition exists when tube 642 is conductive, termed the one condition. The input triggering signal for each circuit is supplied by the preceding one by interconnecting the control grids 644 and 647 through a condenser to the anode 643 of the tube 641 of the preceding circuit. Whereas the gating circuit 545 supplied the triggering pulses to the space deflection counter 546, the carry-over pulse produced by the spacing counter supplies the triggering signals to the line deflection counter 630. During the period that the space deflection unit is generating the proper spacing voltages for the first line of characters to be displayed upon the screen of the cathode ray tube, the line deflection counter 630 remains in its cleared condition with each of the circuits, 631 to 635, set in their zero conditions. The application of the first carry-over pulse applied to the line counter 630 causes the same action as the first pulse developed by the gating circuit 545 and applied to the spacing counter. Similarly, successive carry-over pulses applied to the control grids 644 and 647 of counter circuit 631 are similar in operation to successive pulses applied by the gating circuit 545 to the trigger circuit 547. Likewise, the conversion circuits, 636 to 639, associated with the trigger circuits 632 to 635, respectively, are similar to the circuits 552 to 555 described hereinbefore, and comprise a tube 653 including an anode 654, a screen grid 655, a second control grid 656, a first control grid 657, and a cathode 658. Anode current is afforded the tube 653 by the source of power which is connected to the anode 654 through the primary winding of a transformer 659. The first control grid 657 is both returned to ground through a resistor 662 and coupled by a condenser 663 to the lead 613 over which the master oscillator signal is supplied continuously. The second control grid 656 is coupled by a lead 664 to the anode 643 of the associated trigger circuit 632 and is also connected to a negative source of voltage (not shown) which effectively prevents conduction of the tube. When the associated trigger circuits 632 is switched to its one condition, a positive voltage is applied to the grid 656 which overrides the negative bias voltage and allows the tube to become conductive. The amplified oscillator voltage then appears across the primary winding of the transformer 659. The alternating currents flowing in the secondary of transformer 659 are rectified by a diode 665 and the unidirectional potential eventually appears at the output terminal 666, the magnitude of which is determined by the trigger circuit with which it is associated. The output terminal 666 of circuit 636 is connected through a resistor 667 to the output terminal 668 of circuit 637, which is similarly connected to output terminal 669 of the circuit 638 through a resistor 670. The output terminal 669 of circuit 638 is connected, in turn, through a resistor 671 to the terminal 672 over which the unidirectional voltages developed by the line deflection unit 630 are applied to the vertical deflection plate 384 of the charactron tube. Thus, it becomes apparent that the unidirectional voltages appearing on the output terminals 666, 668, 669, and 672 in the predetermined relationship, for example, of 10, 20, 40, 80 and 160, in accordance with the count registered in the trigger circuits 631 to 635 are effectively added together and appear on terminal 672.

Referring again to Fig. 5, the screen reset, line reset, and line feed circuits 520, 521 and 522 are illustrated which produce an impulse on the associated output terminals 523, 529, and 535, respectively, in response to identifiable code groups. The screen reset code group, which demands clearing of the entire screen of information, generates a pulse on the terminal 523 which is connected both to the switch 589 associated with the space deflection counter 546 and the switch 655 associated with the line deflection counter 630. The positive impulse suffices to open the normally closed switches 589 and 655 which removes the negative bias voltages from control grids 579 of each circuit of the space deflection unit 546 and from the grids 644 of each circuit of the line deflection unit 630 thereby causing all trigger circuits to be set to their zero conductive conditions. This restores both the space and line deflection units to the cleared or initial conditions and directs the next subsequent character to be displayed to the reference position at the upper-left position of the screen 15. The line reset code group, which requests the operation of stopping the line of characters being displayed and positioning the next character at the left margin of the same line, generates a pulse on terminal 529 which causes the switch 589 to open the line connecting the bias supply to the control grids 579 associated with trigger circuits 547 to 551. With a negative bias voltage applied only to the control grids 582 associated with the tubes 577, non-conductive conditions are established therein and the space deflection unit 546 is reset to its cleared condition. The line feed code group commands positioning of the next succeeding character on the next lower line, hence the positive pulse developed by the line feed circuit 522 shown in Fig. 5 may be inverted by a conventional inverter circuit and applied through an isolation diode 673 to both the control grids 644 and 647 of trigger circuit 631. This, as at the instance of the carry-over pulse, causes the line deflection unit 630 to step the next character to be displayed down one line.

During the period of the selection cycle, which includes the starting impulse and the five element code group, the electron beam of the charactron tube is cut-off by the negative bias voltage applied to the control grid thereof. However, when the triggering circuit 51 is restored to its responsive condition by the terminating impulse supplied by the counter circuit 125, a positive pulse, as shown in Fig. 9U, is supplied over lead 675 to the control grid of the charactron tube which allows the flow of electrons from the electron gut to the fluorescent screen.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. In a device for converting pulse groups into visual images, a source of groups of information pulses, each of said groups corresponding to a certain character, a cathode ray tube having at one end thereof an electron source generating and projecting an electron beam and at the other end a screen responsive to said electron beam for converting said electron beam into visual images, a beam shaping member having a set number of character openings randomly positioned in cartesian coordinate array, said openings effecting corresponding shaping to the beam, said member being positioned intermediate the source and the screen, selection means positioned intermediate the source and the member for causing deflection of the beam congruent with the array of openings in response to said groups of information pulses, means responding to said pulse groups for causing conversion and correlation of said groups into predetermined potential combinations, said potential combinations being applied to said selection means for deflecting said beam to a corresponding character opening, said means having a circuit element for each character opening of said character openings, each of said circuit elements being solely responsive to only one particular group of said groups of information pulses and having variable means for changing said potential combination resulting from any particular one of said pulse groups thereby changing the character opening responsive to said one of said pulse groups to another character opening while still utilizing the circuit element varied.

2. In a device for converting pulse groups into visual images, a source for groups of information pulses, each of said groups corresponding to a certain character, a cathode ray tube having at one end thereof an electron source generating and projecting an electron beam and at the other end a screen responsive to said electron beam for converting said electron beam into visual images, a beam shaping member having a randomly positioned in cartesian coordinate array of a set number of character openings, said openings effecting corresponding shaping to the beam, said member being positioned intermediate the source and the screen, selection means positioned intermediate the source and the member for causing deflection of the beam congruent with the array of openings in response to said groups of information pulses, means positioned between said source of pulses and said selection means for selectively coordinating said groups of information pulses with said set number of character openings, said coordinating means having a set number of circuit elements corresponding character by character with said character openings of said beam shaping means, only a particular one of said circuit elements being energized by each predetermined group of said groups of information pulses, and each of said circuit elements having variable means for selectively changing independently the correspondence of individual ones of said circuit elements to a different one of said character openings, thereby selectively varying the correspondence between groups of information pulses and said character openings.

3. In a device for converting binary code groups into visual images, a cathode ray tube display means for visually presenting characters in response to said groups of binary code, said tube having at one end thereof means for generating and projecting an electron beam and at the other end a screen responsive to said electron beam, beam shaping means positioned in said cathode ray tube in the path of said electron beam for shaping said beam received by said screen, said shaping means having randomly positioned in cartesian coordinate array a plurality of character shaped openings, selection means for causing deflection of said beam congruent with a particular character opening of said array in response to a particular group of voltages, a plurality of circuit elements, each of said circuit elements being independently responsive to a single predetermined one of said binary code groups, said elements being individually capable of providing said particular group of voltages to said selection means to cause to be displayed a single character when said individual element is energized by said predetermined one of said binary code groups, said circuit elements having an individual circuit element for each of said characters to be displayed.

4. In a device for converting binary code groups into visual images, a cathode ray tube display means for visually presenting characters in response to said binary code groups, said tube having at one end thereof means for generating and projecting an electron beam and at the other end a screen responsive to said electron beam, beam shaping means positioned in said cathode ray tube in the path of said electron beam for shaping said beam received by said screen, said shaping means having randomly positioned in cartesian coordinate array a plurality of character shaped openings, selection means for causing deflection of said beam congruent with a particular character opening of said array in response to two selection potentials and deflection means for relocating said shaped beam relative to a predetermined position in response to two deflection potentials, decoding means for receiving said binary code groups and for consecutively transforming said groups individually into parallel pulse representations, a selection control unit having a network of separate circuit elements for transforming said pulse representations into two independently variable selection potentials and two independent variable deflection potentials, said decoding means including coincident circuit means having a plurality of intersecting parallel lines arranged in a network overlying said selection control unit in correspondence with said circuit elements, each intersection of individual ones of said intersecting parallel lines corresponding to an individual one of said circuit elements, only one of said circuit elements being energized by said decoding means when said decoding means receives a complete particular one of said binary code groups, each of said circuit elements individually providing said two selection potentials and said two deflection potentials when energized by said particular binary code group, the magnitude of said potential outputs determining the particular character displayed, each of said circuit elements having individual means for variably setting said potential outputs while not affecting the potential outputs of other of said circuit elements, said variable means having independently operable means to selectively establish the potential supplied to said selection and deflection means in response to a particular binary code group thereby permitting a change in the correspondence between any one binary code group and the character caused to be displayed.

References Cited in the file of this patent
UNITED STATES PATENTS

| | | |
|---|---|---|
| 2,379,880 | Burgess | July 10, 1945 |
| 2,458,030 | Rea | Jan. 4, 1949 |
| 2,483,411 | Grieg | Oct. 4, 1949 |
| 2,517,712 | Riggen | Aug. 8, 1950 |
| 2,543,116 | Llewellyn | Feb. 27, 1951 |
| 2,603,716 | Low | July 15, 1952 |
| 2,735,956 | McNaney | Feb. 21, 1956 |
| 2,736,770 | McNaney | Feb. 28, 1956 |

FOREIGN PATENTS

| | | |
|---|---|---|
| 156,861 | Australia | Jan. 17, 1952 |